(12) United States Patent
Ding et al.

(10) Patent No.: US 11,151,680 B2
(45) Date of Patent: Oct. 19, 2021

(54) SYSTEMS AND METHODS FOR RECOMMENDING TRANSPORTATION MEANS

(71) Applicant: BEIJING DIDI INFINITY TECHNOLOGY AND DEVELOPMENT CO., LTD., Beijing (CN)

(72) Inventors: Jiandong Ding, Beijing (CN); Xiaofei Zhou, Beijing (CN)

(73) Assignee: BEIJING DIDI INFINITY TECHNOLOGY AND DEVELOPMENT CO., LTD., Beijing (CN)

(*) Notice: Subject to any disclaimer, the term of this patent is extended or adjusted under 35 U.S.C. 154(b) by 0 days.

(21) Appl. No.: 17/050,846

(22) PCT Filed: Apr. 18, 2019

(86) PCT No.: PCT/CN2019/083282
§ 371 (c)(1),
(2) Date: Oct. 27, 2020

(87) PCT Pub. No.: WO2019/201309
PCT Pub. Date: Oct. 24, 2019

(65) Prior Publication Data
US 2021/0118080 A1    Apr. 22, 2021

(30) Foreign Application Priority Data
Apr. 18, 2018  (CN) .......................... 201810347145.7

(51) Int. Cl.
*G06Q 50/00*    (2012.01)
*G06Q 50/30*    (2012.01)
(Continued)

(52) U.S. Cl.
CPC ........... *G06Q 50/30* (2013.01); *G06K 9/6223* (2013.01); *G06K 9/6276* (2013.01); *G06N 5/04* (2013.01);
(Continued)

(58) Field of Classification Search
CPC ...... G06Q 50/30; G06Q 10/02; G06Q 10/047; G06Q 30/02; G06Q 30/0204;
(Continued)

(56) References Cited

U.S. PATENT DOCUMENTS

| 7,206,965 B2 | 4/2007 | Roddy et al. |
| 9,135,565 B1 | 9/2015 | Dehnert et al. |

(Continued)

FOREIGN PATENT DOCUMENTS

| CN | 103678489 A | 3/2014 |
| CN | 104935963 A | 9/2015 |

(Continued)

OTHER PUBLICATIONS

International Search Report in PCT/CN2019/083282 dated Jul. 18, 2019, 4 pages.

(Continued)

*Primary Examiner* — Khai M Nguyen
(74) *Attorney, Agent, or Firm* — Metis IP LLC

(57) ABSTRACT

Systems and methods for recommending transportation means are provided. The method may include obtaining current travel information of a target user and historical travel information and social information of the target user, respectively. The method may further include determining a user type based on the historical travel information, the user type being a first type or a second type. The method may further include, in response to determining that the target user is a user of the first type, determining a first clustering model based on the historical travel information; or in (Continued)

response to determining that the target user is a user of the second type, determining a second clustering model based on the social information. The method may further include recommending a transportation means to the target user based on the clustering model and the current travel information of the target user.

19 Claims, 11 Drawing Sheets

(51) Int. Cl.
G06K 9/62 (2006.01)
G06N 5/04 (2006.01)
G06Q 10/02 (2012.01)
G06Q 10/04 (2012.01)
G06Q 30/02 (2012.01)
G06F 16/28 (2019.01)
G06F 16/35 (2019.01)

(52) U.S. Cl.
CPC ........... *G06Q 10/02* (2013.01); *G06Q 10/047* (2013.01); *G06Q 30/02* (2013.01); *G06Q 30/0204* (2013.01); *G06F 16/285* (2019.01); *G06F 16/35* (2019.01)

(58) Field of Classification Search
CPC ...... G06K 9/6223; G06K 9/6276; G06N 5/04; G06F 16/285; G06F 16/35
See application file for complete search history.

(56) References Cited

U.S. PATENT DOCUMENTS

| | | | |
|---|---|---|---|
| 9,389,086 | B2 | 7/2016 | Hashem et al. |
| 2010/0312724 | A1 | 12/2010 | Pinckney et al. |
| 2012/0166285 | A1* | 6/2012 | Shapiro .............. G06Q 30/0261 |
| | | | 705/14.58 |
| 2015/0209616 | A1* | 7/2015 | Azose ................ G06Q 30/0631 |
| | | | 434/247 |
| 2015/0276419 | A1 | 10/2015 | Hashem et al. |
| 2016/0117595 | A1* | 4/2016 | Zhang ................... G06Q 50/01 |
| | | | 706/12 |
| 2017/0227367 | A1 | 8/2017 | Thangaraj et al. |
| 2018/0018572 | A1* | 1/2018 | Wang .................... G06Q 50/30 |

FOREIGN PATENT DOCUMENTS

| | | |
|---|---|---|
| CN | 105760503 A | 7/2016 |
| CN | 106529711 A | 3/2017 |
| CN | 106649517 A | 5/2017 |
| CN | 106776900 A | 5/2017 |
| CN | 107609063 A | 1/2018 |
| CN | 107798412 A | 3/2018 |

OTHER PUBLICATIONS

Written Opinion in PCT/CN2019/083282 dated Jul. 18, 2019, 5 pages.

* cited by examiner

700

```
┌─────────────────────────────────────────────────────────┐
│ Obtaining historical travel information of a set of     │
│ users of a same clustering model, wherein the           │──710
│ historical travel information is related to a           │
│ transportation city                                     │
└─────────────────────────────────────────────────────────┘
                            │
                            ▼
┌─────────────────────────────────────────────────────────┐
│ Determining transportation products based on the        │──720
│ historical travel information of the set of users       │
└─────────────────────────────────────────────────────────┘
                            │
                            ▼
┌─────────────────────────────────────────────────────────┐
│ Determining an acceptance rate for each transportation  │
│ product and user historical transfer rates for each     │──730
│ transportation product based on the historical travel   │
│ information                                             │
└─────────────────────────────────────────────────────────┘
                            │
                            ▼
┌─────────────────────────────────────────────────────────┐
│ Determining a product flow chart of the transportation  │
│ city based on the transportation products, the          │──740
│ acceptance rates, and the user historical transfer     │
│ rates                                                   │
└─────────────────────────────────────────────────────────┘
```

FIG. 7

| Weight matrix | b1 | b2 | b3 | ... | bk-1 | bk |
|---|---|---|---|---|---|---|
|  | 0.76 | 0.44 | 0 | ... | 0.83 | 0.67 |
| b2 |  | 0.06 | -0.35 | ... |  |  |
| b3 | 0.45 | -0.69 | 0.52 | ... |  | -0.59 |
| ... | ... | ... | ... | 0.03 | ... | ... |
| bk-1 |  | 0.28 | -0.78 | ... | 0.87 | 0.23 |
| bk | 0.92 |  | 0.80 | ... |  | 0.96 |

FIG. 10

SYSTEMS AND METHODS FOR RECOMMENDING TRANSPORTATION MEANS

CROSS-REFERENCE TO RELATED APPLICATIONS

This application is a U.S. national stage under 35 U.S.C. § 371 of International Application No. PCT/CN2019/083282, filed on Apr. 18, 2019, which claims priority of Chinese Patent Application No. 201810347145.7, filed on Apr. 18, 2018, the contents of which are hereby incorporated by reference.

TECHNICAL FIELD

The present disclosure generally relates to systems and methods for Online-to-Offline services, and in particular, to systems and methods for recommending transportation means.

BACKGROUND

With the development of Internet technology, Internet-based Online-to-Offline services (e.g., online taxi-hailing service) become increasingly popular. Users may have preferences for different transportation means (e.g., transportation products of different product logics with similar functions) under different situations. For example, the preferences of users are influenced by pick-up locations, pick-up time points, transportation capacities, etc. The preferences of users are studied to better satisfy first requests initiate by users, in order to increase the satisfaction rate. Therefore, it is desirable to provide systems and methods for recommending transportation means to increase the satisfaction rates of users.

SUMMARY

According to an aspect of the present disclosure, a method for recommending transportation means is provided. The method may be implemented on a computing device having at least one storage device storing a set of instructions for recommending a transportation means, and at least one processor in communication with the at least one storage device. The method may include obtaining current travel information of a target user. The method may further include obtaining historical travel information and social information of the target user. The method may further include determining a user type based on the historical travel information, the user type being a first type or a second type. The method may further include, in response to determining that the target user is a user of the first type, determining a clustering model of the target user based on the historical travel information, wherein the clustering model is a first clustering model; or, in response to determining that the target user is a user of the second type, determining a clustering model of the target user based on the social information, wherein the clustering model is a second clustering model. The method may further include recommending a transportation means to the target user based on the clustering model and the current travel information of the target user.

In some embodiments, the historical travel information may include a count of historical trips. The determining a user type based on the historical travel information may include determining whether the count of historical trips is greater than or equal to a first threshold; in response to determining that the count of historical trips is greater than or equal to the first threshold, determining that the target user is a user of the first type; or in response to determining that the count of historical trips is less than the first threshold, determining that the target user is a user of the second type.

In some embodiments, the recommending a transportation means to the target user based on the clustering model and the current travel information of the target user may include determining a strategy set of the target user based on the clustering model and the current travel information of the target user; and recommending the transportation means to the target user based on the strategy set and the current travel information.

In some embodiments, the determining a strategy set of the target user based on the clustering model and the current travel information of the target user may include determining a current transportation city based on the current travel information; obtaining a product flow chart based on the transportation city and the clustering model; obtaining a real-time supply and demand of transportation products of the transportation city, and updating the product flow chart; determining a plurality of nodes in the updated product flow chart; determining a plurality of the shortest paths corresponding to the plurality of nodes using a Shortest Path Faster algorithm; and determining the strategy set of the target user based on the plurality of the shortest paths.

In some embodiments, the method may further include determining the plurality of nodes of the product flow chart based on the transportation products; determining values of the plurality of nodes based on acceptance rates of the transportation products; and determining weights of edges of the product flow chart based on user historical transfer rates.

In some embodiments, the method may further include obtaining historical travel information of a plurality of users from a transportation platform; obtaining the transportation products based on the historical travel information; determining the acceptance rates of the transportation products based on the historical travel information; determining the user historical transfer rates based on the historical travel information, the user historical transfer rates comprising a positive transfer rate and a negative transfer rate. The positive transfer rate may be, after a request has been transferred from a first transportation product to a second transportation product, the possibility that an order is generated based on the transferred request is higher than the possibility that the order is not generated. The negative transfer rate may be, after a request has been transferred from a first transportation product to a second transportation product, the possibility that an order is not generated is higher than the possibility that the order is generated based on the transferred request.

In some embodiments, the recommending the transportation means to the target user based on the strategy set and the current travel information may include determining a current transportation means of the target user based on the current travel information; determining a first node in the product flow chart based on the current transportation means; determining a shortest path of the first node based on the first node and the strategy set; and recommending a transportation means to the target user based on the shortest path of the first node.

In some embodiments, the first clustering model and the second clustering model may be determined based on a clustering algorithm.

In some embodiments, the method may further include obtaining historical travel information and social information of a plurality of users; determining one or more first clustering models by clustering the historical travel information using an X means algorithm; and determining one or more second clustering models by clustering the social information using the X means algorithm.

In some embodiments, the determining one or more first clustering models by clustering the historical travel information using an X means algorithm may include determining historical transportation requests and historical order information of the plurality of users during a preset time period based on the historical travel information; determining a count of requests of each transportation product and a count of trips of each transportation product, for each of the plurality of users, based on the historical transportation requests and the historical order information of the plurality of users during the preset time period; determining a normalized count of requests of each transportation product during a first time period for each of the plurality of users; determining a normalized count of trips of each transportation product during the first time period, for each of the plurality of users; determining a transportation feature vector for each of the plurality of users based on the normalized count of requests during the first time period and the normalized count of trips during the first time period; and determining the one or more first clustering models by clustering the transportation feature vectors of the plurality of users, using the X means algorithm.

In some embodiments, the determining one or more second clustering models by clustering the social information using the X means algorithm may include determining natural attribute information and social attribute information of the plurality of users based on the social information, wherein the natural attribute information includes a gender and an age, and the social attribute information includes an occupation and an income; determining a populace feature vector for each of the plurality of users by digitizing the natural attribute information and the social attribute information; and determining the one or more second clustering models by clustering the populace feature vectors of the plurality of users, using the X means algorithm.

According to another aspect of the present disclosure, a system for recommending transportation system is provided. The system may include at least one computer-readable storage medium storing a set of instructions; and at least one processor in communication with the at least one computer-readable storage medium. When executing the set of instructions, the at least one processor may be obtain current travel information of a target user. The at least one processor may obtain historical travel information and social information of the target user. The at least one processor may determine a user type based on the historical travel information, the user type being a first type or a second type. The at least one processor may, in response to determining that the target user is a user of the first type, determine a clustering model of the target user based on the historical travel information, wherein the clustering model is a first clustering model; or, in response to determining that the target user is a user of the second type, determine a clustering model of the target user based on the social information, wherein the clustering model is a second clustering model. The at least one processor may recommend a transportation means to the target user based on the clustering model and the current travel information of the target user.

In some embodiments, the historical travel information may include a count of historical trips. The at least one processor may determine whether the count of historical trips is greater than or equal to a first threshold. In response to determining that the count of historical trips is greater than or equal to the first threshold, the at least one processor may determine that the target user is a user of the first type. In response to determining that the count of historical trips is less than the first threshold, the at least one processor may determine that the target user is a user of the second type.

In some embodiments, the at least one processor may determine a strategy set of the target user based on the clustering model and the current travel information of the target user. The at least one processor may recommend the transportation means to the target user based on the strategy set and the current travel information.

In some embodiments, the at least one processor may determine a current transportation city based on the current travel information. The at least one processor may obtain a product flow chart based on the transportation city and the clustering model. The at least one processor may obtain a real-time supply and demand of transportation products of the transportation city, and update the product flow chart; determining a plurality of nodes in the updated product flow chart. The at least one processor may determine a plurality of the shortest paths corresponding to the plurality of nodes using a Shortest Path Faster algorithm. The at least one processor may determine the strategy set of the target user based on the plurality of the shortest paths.

In some embodiments, the at least one processor may further determine the plurality of nodes of the product flow chart based on the transportation products. The at least one processor may further determine values of the plurality of nodes based on acceptance rates of the transportation products. The at least one processor may further determine weights of edges of the product flow chart based on user historical transfer rates.

In some embodiments, the at least one processor may further obtain historical travel information of a plurality of users from a transportation platform. The at least one processor may further obtain the transportation products based on the historical travel information. The at least one processor may further determine the acceptance rates of the transportation products based on the historical travel information. The at least one processor may further determine the user historical transfer rates based on the historical travel information, the user historical transfer rates comprising a positive transfer rate and a negative transfer rate. The positive transfer rate may be, after a request has been transferred from a first transportation product to a second transportation product, the possibility that an order is generated based on the transferred request is higher than the possibility that the order is not generated. The negative transfer rate may be, after a request has been transferred from a first transportation product to a second transportation product, the possibility that an order is not generated is higher than the possibility that the order is generated based on the transferred request.

In some embodiments, the at least one processor may determine a current transportation means of the target user based on the current travel information; determining a first node in the product flow chart based on the current transportation means. The at least one processor may determine a shortest path of the first node based on the first node and the strategy set. The at least one processor may recommend a transportation means to the target user based on the shortest path of the first node.

In some embodiments, the first clustering model and the second clustering model may be determined based on a clustering algorithm.

In some embodiments, the at least one processor may further obtain historical travel information and social information of a plurality of users. The at least one processor may further determine one or more first clustering models by clustering the historical travel information using an X means algorithm. The at least one processor may determine one or more second clustering models by clustering the social information using the X means algorithm.

In some embodiments, the at least one processor may determine historical transportation requests and historical order information of the plurality of users during a preset time period based on the historical travel information. The at least one processor may determine a count of requests of each transportation product and a count of trips of each transportation product, for each of the plurality of users, based on the historical transportation requests and the historical order information of the plurality of users during the preset time period. The at least one processor may determine a normalized count of requests of each transportation product during a first time period for each of the plurality of users. The at least one processor may determine a normalized count of trips of each transportation product during the first time period, for each of the plurality of users. The at least one processor may determine a transportation feature vector for each of the plurality of users based on the normalized count of requests during the first time period and the normalized count of trips during the first time period. The at least one processor may determine determining the one or more first clustering models by clustering the transportation feature vectors of the plurality of users, using the X means algorithm.

In some embodiments, the at least one processor may determine natural attribute information and social attribute information of the plurality of users based on the social information. The natural attribute information may include a gender and an age. The social attribute information may include an occupation and an income. The at least one processor may determine a populace feature vector for each of the plurality of users by digitizing the natural attribute information and the social attribute information. The at least one processor may determine the one or more second clustering models by clustering the populace feature vectors of the plurality of users, using the X means algorithm.

According to another aspect of the present disclosure, a system for recommending a transportation means is provided. The system may include an obtaining module, a user type determination module, a clustering model determination module and a transportation means determination module. The obtaining module may include a first obtaining unit and a second obtaining unit. The first obtaining unit may be configured to obtain current travel information of a target user. The second obtaining unit may be configured to obtain social information and historical travel information of the target user. The user type determination module may be configured to determine a user type based on the historical travel information. The clustering model determination module may include a first clustering model determination unit and a second clustering model determination unit. The first clustering model determination unit may be configured to determine a first clustering model based on the historical travel information. The second clustering model determination unit may be configured to determine a second clustering model based on the social information. The transportation means determination module may be configured to recommend a transportation means to the target user based on the clustering model and the current travel information.

In some embodiments, the system may further include a product flow chart determination module and a shortest path determination module. The product flow chart determination module may be configured to determine a product flow chart based on the clustering model and the current travel information. The shortest path determination module may be configured to determine a shortest path corresponding to a node in the product flow chart based on a Shortest Path Faster algorithm. The shortest path may be configured to recommend a transportation means to the target user.

According to another aspect of the present disclosure, a system for recommending a transportation means is provided. The system may include an obtaining module, a clustering module, a product flow chart construction module and a product flow chart construction module. The obtaining module may be configured to obtain social information and historical travel information of a plurality of users. The clustering module may include a first clustering unit and a second clustering unit. The first clustering unit may be configured to determine one or more first clustering models based on the historical travel information. The second clustering unit may be configured to determine one or more second clustering models based on the social information. The product flow chart construction module may be configured to determine a product flow chart of a cluster based on the historical travel information, the one or more first clustering models, or the one or more second clustering models.

According to another aspect of the present disclosure, a non-transitory computer readable medium is provided. The non-transitory computer readable medium may include a set of instructions for speech recognition. When executed by at least one processor, the set of instructions may direct the at least one processor to effectuate a method. The method may include obtaining current travel information of a target user. The method may further include obtaining historical travel information and social information of the target user. The method may further include determining a user type based on the historical travel information, the user type being a first type or a second type. The method may further include, in response to determining that the target user is a user of the first type, determining a clustering model of the target user based on the historical travel information, wherein the clustering model is a first clustering model; or, in response to determining that the target user is a user of the second type, determining a clustering model of the target user based on the social information, wherein the clustering model is a second clustering model. The method may further include recommending a transportation means to the target user based on the clustering model and the current travel information of the target user.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 7 is a flowchart illustrating an exemplary process for product flow chart determining according to some embodiments of the present disclosure;

FIG. 10 is a schematic diagram illustrating an exemplary weight matrix of a cluster according to some embodiments of the present disclosure.

DETAILED DESCRIPTION

Figure 1:
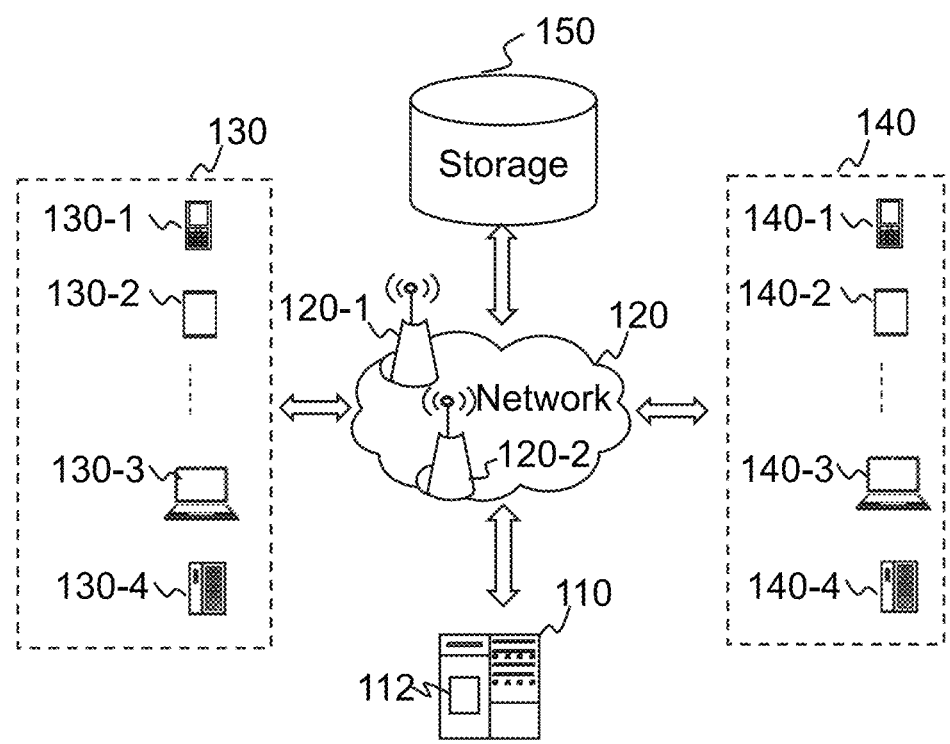
FIG. 1 is a schematic diagram illustrating an exemplary transportation means recommending system according to some embodiments of the present disclosure.

The following description is presented to enable any person skilled in the art to make and use the present disclosure and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to some embodiments shown but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowchart may be implemented not in order. Conversely, the operations may be implemented in inverted order, or simultaneously. Moreover, one or more other operations may be added to the flowcharts. One or more operations may be removed from the flowcharts.

Moreover, while the systems and methods disclosed in the present disclosure are described primarily regarding on-demand service, it should also be understood that this is only one exemplary embodiment. The systems and methods of the present disclosure may be applied to any other kind of on-demand service. For example, the systems and methods of the present disclosure may be applied to transportation systems of different environments including land, ocean, aerospace, or the like, or any combination thereof. The vehicle of the transportation systems may include a taxi, a private car, a hitch, a bus, a train, a bullet train, a high-speed rail, a subway, a vessel, an aircraft, a spaceship, a hot-air balloon, a driverless vehicle, or the like, or any combination thereof. The transportation system may also include any transportation system for management and/or distribution, for example, a system for sending and/or receiving an express. The application of the systems and methods of the present disclosure may include a webpage, a plug-in of a browser, a client terminal, a custom system, an internal analysis system, an artificial intelligence robot, or the like, or any combination thereof.

The terms "passenger," "requester," "requester," "service requester," "service requester," and "customer" in the present disclosure are used interchangeably to refer to an individual, an entity or a tool that may request or order a service. Also, the terms "driver," "provider," "service provider," and "supplier" in the present disclosure are used interchangeably to refer to an individual, an entity or a tool that may provide a service or facilitate the providing of the service. The term "user" in the present disclosure refers to an individual, an entity or a tool that may request a service, order a service, provide a service, or facilitate the providing of the service. In the present disclosure, terms "requester" and "requester terminal" may be used interchangeably, and terms "provider" and "provider terminal" may be used interchangeably.

The terms "request," "service," "service request," and "order" in the present disclosure are used interchangeably to refer to a request that may be initiated by a passenger, a requester, a service requester, a customer, a driver, a provider, a service provider, a supplier, or the like, or any combination thereof. The service request may be accepted by any one of a passenger, a requester, a service requester, a customer, a driver, a provider, a service provider, or a supplier. The service request may be chargeable or free.

An aspect of the present disclosure relates to systems and methods for recommending transportation means associated with Online-to-Offline services. For example, a system may obtain travel information and social information of a target user. The system may further determine a user type based on historical travel information, wherein the user type may include a first type associated with users of relatively more historical travel information and a second type associated with users of relatively less historical travel information. Further, the system may determine a clustering model of the target user configured to predict user preferences of transportation means, based on the user type of the target user, wherein the clustering model is a first clustering model based on travel information determine or a second clustering model determined based on social information. According to the transportation means recommending method, the system may recommend suitable transportation means to the target user based on current travel information and the clustering model, which may improve service satisfaction of users of the Online-to-Offline services.

It should be noted that online on-demand service, such as online taxi-hailing services, is a new form of service rooted only in post-Internet era. It provides technical solutions to users and service providers that could raise only in post-Internet era. In the pre-Internet era, when a passenger hails a taxi on the street, the taxi request and acceptance occur only between the passenger and one taxi driver that sees the passenger. If the passenger hails a taxi through a telephone call, the service request and acceptance may occur only between the passenger and one service provider (e.g., one taxi company or agent). Online taxi, however, allows a user of the service to real-time and automatically distribute a service request to a vast number of individual service providers (e.g., taxi) distance away from the user. It also allows a plurality of service providers to respond to the service request simultaneously and in real-time. Therefore, through the Internet, the transportation means recommending system may provide a much more efficient transaction platform for the users and the service providers that may never meet in a traditional pre-Internet transportation means recommending system.

FIG. 1 is a schematic diagram illustrating an exemplary transportation means recommending system according to some embodiments of the present disclosure. In some embodiments, the transportation means recommending system 100 may be a system for Online-to-Offline services. For example, the transportation means recommending system 100 may be an online transportation service platform for transportation services such as taxi hailing, chauffeur services, delivery vehicles, carpool, bus service, driver hiring, and shuttle services. The transportation means recommending system 100 may be a platform including a transportation means recommending device 110, a network 120, a requester terminal 130, a provider terminal 140, and a storage 150.

In some embodiments, the transportation means recommending device 110 may be a single server, or a server group. The server group may be centralized, or distributed (e.g., transportation means recommending device 110 may be a distributed system). In some embodiments, the transportation means recommending device 110 may be local or remote. For example, the transportation means recommending device 110 may access information and/or data stored in the requester terminal 130, the provider terminal 140, and/or the storage 150 via the network 120. As another example, the transportation means recommending device 110 may connect the requester terminal 130, the provider terminal 140, and/or the storage 150 to access stored information and/or data. In some embodiments, the transportation means recommending device 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the transportation means recommending device 110 may be implemented on a computing device 200 having one or more components illustrated in FIG. 2 in the present disclosure.

In some embodiments, the transportation means recommending device 110 may include a processing engine 112. The processing engine 112 may process information and/or data relating to a service request to perform one or more functions described in the present disclosure. For example, the processing engine 112 may execute instructions for recommending transportation means, determine a transportation means for a target user using based on a clustering model and current travel information of the target user, and transmit a recommending instruction to the one or more service requesters. In some embodiments, the processing engine 112 may include one or more processing engines (e.g., single-core processing engine(s) or multi-core processor(s)). Merely by way of example, the processing engine 112 may include one or more hardware processors, such as a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

The network 120 may facilitate exchange of information and/or data. In some embodiments, one or more components of the transportation means recommending system 100 (e.g., the transportation means recommending device 110, the requester terminal 130, the provider terminal 140, and the storage 150) may transmit information and/or data to another component(s) in the transportation means recommending system 100 via the network 120. For example, the transportation means recommending device 110 may receive GPS data from the provider terminal 140 via the network 120. In some embodiments, the network 120 may be any type of wired or wireless network, or combination thereof. Merely by way of example, the network 120 may include a cable network, a wireline network, an optical fiber network, a tele communications network, an intranet, an Internet, a local area network (LAN), a wide area network (WAN), a wireless local area network (WLAN), a metropolitan area network (MAN), a public telephone switched network (PSTN), a Bluetooth network, a ZigBee network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the transportation means recommending system 100 may be connected to the network 120 to exchange data and/or information.

In some embodiments, a service requester may be a user of the requester terminal 130. In some embodiments, the user of the requester terminal 130 may be someone other than the service requester. For example, a user A of the requester terminal 130 may use the requester terminal 130 to transmit a service request for a user B, or receive a service confirmation and/or information or instructions from the transportation means recommending device 110. In some embodiments, a service provider may be a user of the provider terminal 140. In some embodiments, the user of the provider terminal 140 may be someone other than the service provider. For example, a user C of the provider terminal 140 may use the provider terminal 140 to receive a service request for a user D, and/or information or instructions from the transportation means recommending device 110. In some embodiments, "service requester" and "requester terminal" may be used interchangeably, and "service provider" and "provider terminal" may be used interchangeably.

In some embodiments, the requester terminal 130 may include a mobile device 130-1, a tablet computer 130-2, a laptop computer 130-3, a built-in device in a motor vehicle 130-4, or the like, or any combination thereof. In some embodiments, the mobile device 130-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, a smart footgear, a smart glass, a smart helmet, a smart watch, a smart clothing, a smart backpack, a smart accessory, or the like, or any combination thereof. In some embodiments, the smart mobile device may include a smartphone, a personal digital assistant (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass™, a RiftCon™, a Fragments™, a Gear VR™, etc. In some embodiments, the built-in device in the motor vehicle 130-4 may include an onboard computer, an onboard television, etc. In some embodiments, the requester terminal 130 may be a device with positioning technology for locating the position of the requester and/or the requester terminal 130.

In some embodiments, the provider terminal 140 may be similar to, or the same device as the requester terminal 130. In some embodiments, the provider terminal 140 may be a device with positioning technology for locating the position of the provider and/or the provider terminal 140. In some embodiments, the provider terminal 140 may periodically transmit GPS data to the transportation means recommending device 110. In some embodiments, the requester terminal 130 and/or the provider terminal 140 may communicate with another positioning device to determine the position of the requester, the requester terminal 130, the provider, and/or the provider terminal 140. In some embodiments, the requester terminal 130 and/or the provider terminal 140 may transmit positioning information to the transportation means recommending device 110.

The storage 150 may store data and/or instructions. In some embodiments, the storage 150 may store data obtained from the requester terminal 130 and/or the provider terminal 140. In some embodiments, the storage 150 may store data and/or instructions that the transportation means recommending device 110 may execute or use to perform exemplary methods described in the present disclosure. In some embodiments, the storage 150 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage 150 may be connected to the network 120 to communicate with one or more components of the transportation means recommending system 100 (e.g., the transportation means recommending device 110, the requester terminal 130, the provider terminal 140). One or more components in the transportation means recommending system 100 may access the data or instructions stored in the storage 150 via the network 120. In some embodiments, the storage 150 may be directly connected to or communicate with one or more components in the transportation means recommending system 100 (e.g., the transportation means recommending device 110, the requester terminal 130, the provider terminal 140). In some embodiments, the storage 150 may be part of the transportation means recommending device 110.

In some embodiments, one or more components of the transportation means recommending system 100 (e.g., the transportation means recommending device 110, the requester terminal 130, the provider terminal 140) may access the storage 150. In some embodiments, one or more components of the transportation means recommending system 100 may read and/or modify information relating to the requester, provider, and/or the public when one or more conditions are met. For example, the transportation means recommending device 110 may read and/or modify one or more users' information after a service. As another example, the provider terminal 140 may access information relating to the requester when receiving a service request from the requester terminal 130, but the provider terminal 140 may not modify the relevant information of the requester.

In some embodiments, information exchanging of one or more components of the transportation means recommending system 100 may be achieved by way of requesting a service. The object of the service request may be any product. In some embodiments, the product may be a tangible product, or immaterial product. The tangible product may include food, medicine, commodity, chemical product, electrical appliance, clothing, car, housing, luxury, or the like, or any combination thereof. The immaterial product may include a servicing product, a financial product, a knowledge product, an internet product, or the like, or any combination thereof. The internet product may include an individual host product, a web product, a mobile internet product, a commercial host product, an embedded product, or the like, or any combination thereof. The mobile internet product may be used in a software of a mobile terminal, a program, a system, or the like, or any combination thereof. The mobile terminal may include a tablet computer, a laptop computer, a mobile phone, a personal digital assistant (PDA), a smart watch, a point of sale (POS) device, an onboard computer, an onboard television, a wearable device, or the like, or any combination thereof. For example, the product may be any software and/or application used on the computer or mobile phone. The software and/or application may relate to socializing, shopping, transporting, entertainment, learning, investment, or the like, or any combination thereof. In some embodiments, the software and/or application relating to transporting may include a traveling software and/or application, a vehicle scheduling software and/or application, a mapping software and/or application, etc. In the vehicle scheduling software and/or application, the vehicle may include a horse, a carriage, a rickshaw (e.g., a wheelbarrow, a bike, a tricycle), a car (e.g., a taxi, a bus, a private car), a train, a subway, a vessel, an aircraft (e.g., an airplane, a helicopter, a space shuttle, a rocket, a hot-air balloon), or the like, or any combination thereof.

One of ordinary skill in the art would understand that when an element of the transportation means recommending system 100 performs, the element may perform through electrical signals and/or electromagnetic signals. For example, when a requester terminal 130 processes a task, such as making a determination, identifying or selecting an object, the requester terminal 130 may operate logic circuits in its processor to process such task. When the requester terminal 130 sends out a service request to the transportation means recommending device 110, a processor of the service requester terminal 130 may generate electrical signals encoding the service request. The processor of the requester terminal 130 may then send the electrical signals to an output port. If the requester terminal 130 communicates with the transportation means recommending device 110 via a wired network, the output port may be physically connected to a cable, which may further transmit the electrical signals to an input port of the transportation means recommending device 110. If the requester terminal 130 communicates with the transportation means recommending device 110 via a wireless network, the output port of the requester terminal 130 may be one or more antennas, which may convert the electrical signals to electromagnetic signals. Similarly, a provider terminal 140 may process a task through operation of logic circuits in its processor, and receive an instruction and/or service request from the transportation means recommending device 110 via electrical signals or electromagnet signals. Within an electronic device, such as the requester terminal 130, the provider terminal 140, and/or the transportation means recommending device 110, when a processor thereof processes an instruction, sends out an instruction, and/or performs an action, the instruction and/or action is conducted via electrical signals. For example, when the processor retrieves or saves data from a storage medium (e.g., the storage 150), it may send out electrical signals to a read/write device of the storage medium, which may read or write structured data in the storage medium. The structured data may be transmitted to the processor in the form of electrical signals via a bus of the electronic device. Here, an electrical signal refers to one electrical signal, a series of electrical signals, and/or a plurality of discrete electrical signals.

Figure 2:
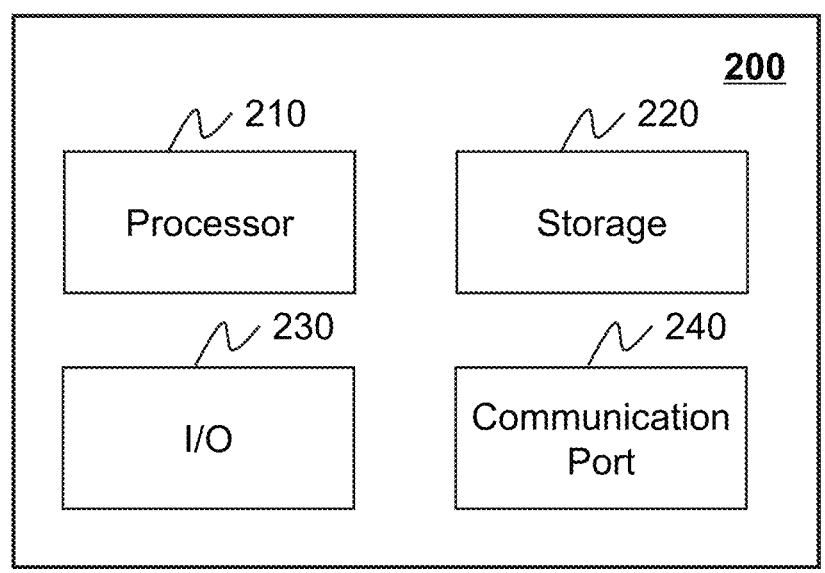
FIG. 2 is a schematic diagram illustrating exemplary hardware and/or software components of a computing device on which a processing engine may be implemented according to some embodiments of the present disclosure.

FIG. 2 is a schematic diagram illustrating exemplary hardware and/or software components of a computing device on which the processing engine 112 may be implemented according to some embodiments of the present disclosure. As illustrated in FIG. 2, the computing device 200 may include a processor 210, a storage 220, an input/output (I/O) 230, and a communication port 240.

The processor 210 (e.g., logic circuits) may execute computer instructions (e.g., program code) and perform functions of the processing engine 112 in accordance with techniques described herein. For example, the processor 210 may include interface circuits 210-$a$ and processing circuits 210-$b$ therein. The interface circuits may be configured to receive electronic signals from a bus (not shown in FIG. 2), wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus.

The computer instructions may include, for example, routines, programs, objects, components, data structures, procedures, modules, and functions, which perform particular functions described herein. For example, the processor 210 may determine at least one target user for an activity. In some embodiments, the processor 210 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200. However, it should be noted that the computing device 200 in the present disclosure may also include multiple processors, thus operations and/or method steps that are performed by one processor as described in the present disclosure may also be jointly or separately performed by the multiple processors. For example, if in the present disclosure the processor of the computing device 200 executes both step A and step B, it should be understood that step A and step B may also be performed by two or more different processors jointly or separately in the computing device 200 (e.g., a first processor executes step A and a second processor executes step B, or the first and second processors jointly execute steps A and B).

The storage 220 may store data/information obtained from the user terminal 130, the storage device 150, and/or any other component of the transportation means recommending system 100. In some embodiments, the storage 220 may include a mass storage, a removable storage, a volatile read-and-write memory, a read-only memory (ROM), or the like, or any combination thereof. For example, the mass storage may include a magnetic disk, an optical disk, a solid-state drives, etc. The removable storage may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 220 may store one or more programs and/or instructions to perform exemplary methods described in the present disclosure. For example, the storage 220 may store recommendation data of a plurality of historical activities.

The I/O 230 may input and/or output signals, data, information, etc. In some embodiments, the I/O 230 may enable a user interaction with the processing engine 112. In some embodiments, the I/O 230 may include an input device and an output device. Examples of the input device may include a keyboard, a mouse, a touch screen, a microphone, or the like, or a combination thereof. Examples of the output device may include a display device, a loudspeaker, a printer, a projector, or the like, or a combination thereof. Examples of the display device may include a liquid crystal display (LCD), a light-emitting diode (LED)-based display, a flat panel display, a curved screen, a television device, a cathode ray tube (CRT), a touch screen, or the like, or a combination thereof.

The communication port 240 may be connected to a network (e.g., the network 120) to facilitate data communications. The communication port 240 may establish connections between the processing engine 112 and the user terminal 130, or the storage device 150. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee link, a mobile network link (e.g., 3G, 4G, 5G, etc.), or the like, or a combination thereof. In some embodiments, the communication port 240 may be and/or include a standardized communication port, such as RS232, RS485, etc.

Figure 3:
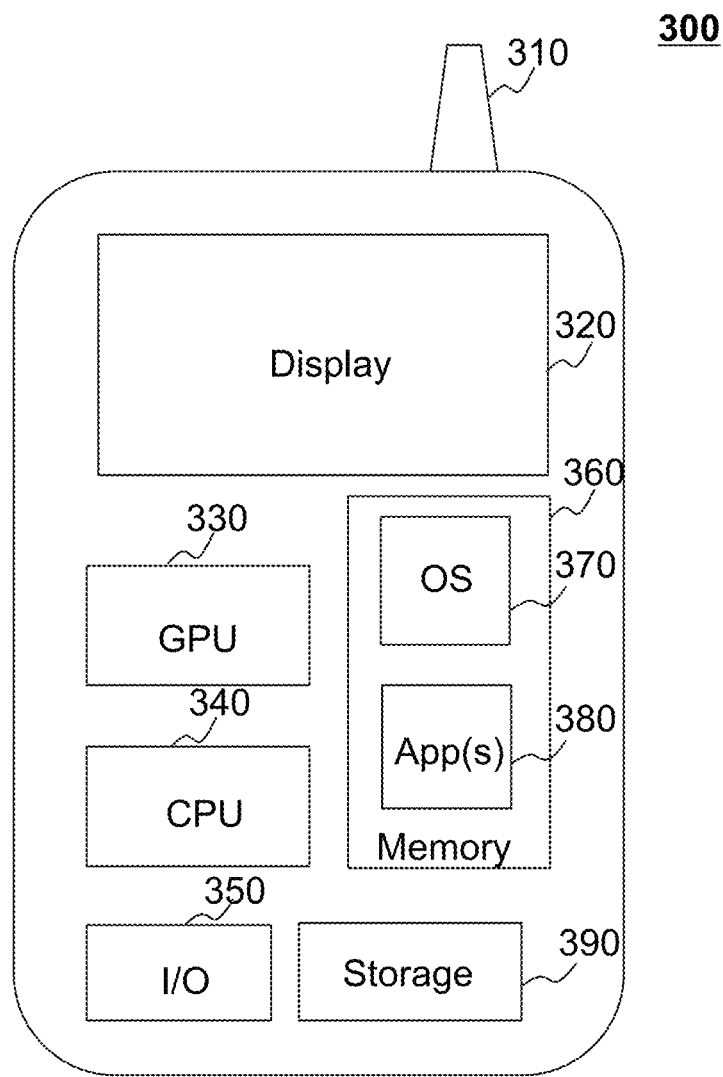
FIG. 3 is a schematic diagram illustrating exemplary hardware and/or software components of a mobile device according to some embodiments of the present disclosure.

FIG. 3 is a schematic diagram illustrating exemplary hardware and/or software components of a mobile device 300 according to some embodiments of the present disclosure. In some embodiments, the requester terminal 130 or the provider terminal 140 may be implemented on the computing device 300. As illustrated in FIG. 3, the mobile device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300.

In some embodiments, a mobile operating system 370 (e.g., iOS™, Android™, Windows Phone™, etc.) and one or more applications 380 may be loaded into the memory 360 from the storage 390 in order to be executed by the CPU 340. The applications 380 may include a browser or any other suitable mobile apps for receiving and rendering information relating to on-demand services or other information from the transportation means recommending system 100. User interactions with the information stream may be achieved via the I/O 350 and provided to the processing engine 112 and/or other components of the transportation means recommending system 100 via the network 120.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Figure 4:
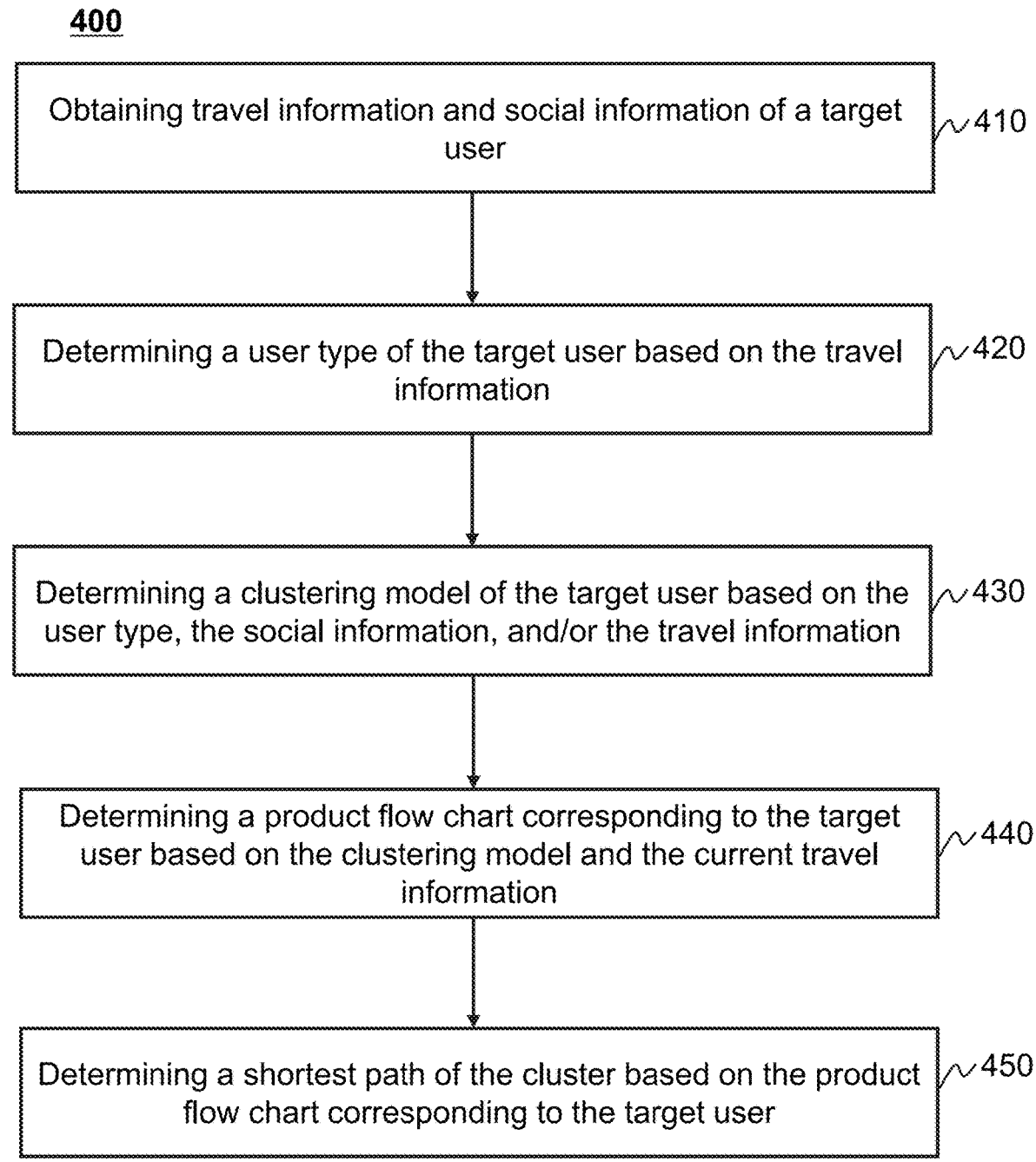
FIG. 4 is a flowchart illustrating an exemplary process for recommending transportation means according to some embodiments of the present disclosure.

FIG. 4 is a flowchart illustrating an exemplary process for recommending transportation means according to some embodiments of the present disclosure. The process 400 may be executed by the transportation means recommending system 100. For example, the process 400 may be implemented as a set of instructions (e.g., an application) stored in the storage ROM 230 or RAM 240. The processor 220 and/or modules in the FIGS. 8-9 may execute the set of instructions, and when executing the instructions, the processor 220 and/or the modules may be configured to perform the process 400. The operations of the illustrated process presented below are intended to be illustrative. In some embodiments, the process 400 may be accomplished with one or more additional operations not described and/or without one or more of the operations discussed. Additionally, the order in which the operations of the process as illustrated in FIG. 4 and described below is not intended to be limiting.

In 410, the processing engine 112 (e.g., the obtaining model 810) may obtain travel information and social information of a target user. The processing engine 112 may obtain the travel information and the social information when the target user initiate a transportation service request via the requester terminal 130. The transportation service may be configured to transport a subject from a pick-up location to a destination, via a transportation means. As used herein, the subject may refer to any composition of organic and/or inorganic matters that are with or without life. For example, the subject may be the target user.

The travel information may include pick-up location information, destination information, a pick-up time point, a transportation means, a route, etc. The transportation means may include a transportation product, with which the subject travels. Exemplary transportation products may include a taxi, an express, a hitchhiking, a special car, or the like, or any combination thereof. In some embodiments, the travel information of the target user may include current travel information of the target user and travel information of the target user in a preset time period (also referred to as historical travel information). The preset time period may be the last one month, the last three months, the last half year, etc. The social information of the target user may include natural attribute information and social attribute information. The natural attribute information may include a gender, an age, etc. The social attribute information may include an occupation, an income, etc. Alternatively, the processing engine 112 may obtain using habits of the target user. The using habits may include one or more frequently used pick-up time periods (e.g. morning and evening rush hours, weekends), one or more frequently used pick-up locations, one or more frequently used destination, or the like, or any combination thereof.

In some embodiments, the processing engine 112 may obtain the travel information and the social information from a transportation service application (also referred to as an APP) installed in an electronic device of the target user (e.g., the requester terminal 130), wherein the transportation service APP collects and record the travel information and the social information of the target user in real time. The electronic device may be connected to the transportation means recommending system 100 through a communication port (e.g., the communication port 240). The collected travel information and social information may be sent to one or more components of the transportation means recommending system 100 (e.g., the processing engine 112, the transportation means recommending device 110, the storage 150) through the communication port. In some embodiments, the processing engine 112 may obtain the travel information and the social information from a storage device (e.g., the storage 150) of the transportation means recommending system 100.

In 420, the processing engine 112 (e.g., the user type determination model 820) may determine a user type of the target user based on the travel information. The user type may be a first type or a second type. The user of the first type may refer to a user who has relatively more historical travel information (e.g., having 3, 5, or 8 historical orders) compared with the user of the second type. The user of the second type may refer to a user who has relatively less historical travel information (e.g., having 0, 1, 2 historical orders) compared with the user of the first type. It should be noted that a user with 0 historical orders may also have historical travel information, wherein the historical travel information may indicate the user complete no historical orders and no information may be deduced from the historical travel information.

In some embodiments, the processing engine 112 may obtain historical travel information of the target user in a preset time period (e.g., the last year), wherein the historical travel information may include historical order records (e.g., historical orders, historical pick-up time periods, historical routes, historical transportation means, etc.) The processing engine 112 may determine the user type based on the count of the historical orders (also referred to as the count of historical trips). In response to determining that the count of historical trips is relatively more, the processing engine 112 may determine that the target user is a user of the first type. In response to determining that the count of historical trips is relatively less, the processing engine 112 may determine that the target user is a user of the second type.

In some embodiments, the processing engine 112 may determine whether the count of historical trips is greater than or equal to a first threshold. In response to determining that the count of historical trips is greater than or equal to the first threshold, the processing engine 112 may determine that the target user is a user of the first type. In response to determining that the count of historical trips is less than the first threshold, the processing engine 112 may determine that the target user is a user of the second type. The first threshold may be default settings of the transportation means recommending system 100 or may be adjustable under different situations. For example, the first threshold may be 1, 3, 5, etc.

In some embodiments, the travel information and the social information may be obtained by the electronic device installed on a mobile phone of the target user, and may be stored in the storage device (e.g., the storage 150) of the transportation means recommending system 100 through a communication port (e.g., the communication port 240).

In 430, the processing engine 112 (e.g., the clustering model determination model 830) may determine a clustering model of the target user based on the user type, the social information, and/or the travel information. Based on the user type, the processing engine 112 may determine which kind of information (e.g., the social information, or the travel information) to be used to determine the clustering model of the target user.

In response to the determining that the target user is a user of the first type, the processing engine 112 may determine a first clustering model of the target user from one or more first clustering models based on the historical travel information of the target user. The first clustering model of the target user may be a first clustering model corresponding to a set of users whose travel information is similar to that of the target user. In response to the determining that the target user is a user of the second type, the processing engine 112 may determine a second clustering model of the target user from one or more second clustering models based on the social information of the target user. The second clustering model of the target user may be a second clustering model corresponding to a set of users whose social information is similar to that of the target user.

In response to the determining that the target user is a user of the first type, the processing engine 112 may determine transportation service requests and order information of the target user in a preset time period based on the travel information. A transportation service request may refer to a request to transport a subject from a pick-up location to a destination via a transportation means, using a transportation product. As used herein, the subject may refer to any composition of organic and/or inorganic matters that are with or without life. The transportation service request of a user may be generated by the user via the transportation service application on the requester terminal 130. The transportation service request may include a transportation means, a pick-up time point, a route, a price, or the like, or any combination thereof. The order information may be related to an order, that is, an accepted transportation service request.

In response to the determining that the target user is a user of the first type, the processing engine 112 may determine the transportation service requests based on a count of (historical transportation service) requests of each transportation product. In response to the determining that the target user is a user of the first type, the processing engine 112 may determine the order information based on a count of (historical) trips of each transportation product. As used herein, a count of requests of a transportation product of the target user may be the number (count) of requests for a transportation service for using the transportation product (including unaccepted requests and accepted requester (also referred to as orders)) initiated by the target user. A count of trips of a transportation product may be the number (count) of orders using the transportation product of the target user, that is, the number (count) of requests for using the transportation product that have been accepted. An unaccepted request may refer to a request for a transportation product initiates by a service requester that is not accepted by any service providers. An order may be generated after a request is accepted. Alternatively, an order may refer to an accepted service request and the subject has been transportation to the destination.

The processing engine 112 may determine a normalized count of (historical) requests of each transportation product and a normalized count of (historical) trips of each transportation product. The normalized count may be a weekly average, a monthly average, a quarterly average. The processing engine 112 may determine a travel feature vector of the target user based on the normalized count of (historical) requests of each transportation product and the normalized count of (historical) trips of each transportation product. The travel feature factor may include ratios of the normalized count of (historical) requests of each transportation product to the normalized count of (historical) trips of each transportation product. The travel feature vector may reflect user's requests for different transportation products and which requests are accepted. The processing engine 112 may determine a first clustering model based on the travel feature vector of the target user. For example, the processing engine 112 may determine a first clustering model corresponding to a set of plurality of users whose travel feature vectors are similar to that of the target user as the first clustering model of the target user. Detailed descriptions regarding the determination of the first clustering model may be found elsewhere in the present disclosure (e.g., FIG. 5, and the descriptions thereof).

In response to the determining that the target user is a user of the second type, the processing engine 112 may determine the natural attribute information and the social attribute information of the target user based on the social information.

The processing engine 112 may determine a populace feature vector by digitizing the natural attribute information and the social attribute information. For example, the processing engine 112 may digitize the income of the target user as a sequence of binary digits based on the value of a monthly pay. The processing engine 112 may use [0, 0, 0] to represent a monthly pay less than 5000 RMB, [0, 0, 1] to represent a monthly pay between 5000 RMB-10000 RMB, [0, 1, 0] to represent a monthly pay between 10000 RMB-15000 RMB, [0, 1, 1] to represent a monthly pay between 15000 RMB-20000 RMB, [1, 0, 0] to represent a monthly pay more than 25000 RMB. For another example, the processing engine 112 may use [0, 0] to represent a male, and [0, 1] to represent a female. The processing engine 112 may determine the second clustering model based on the populace feature vector of the target user. For example, the processing engine 112 may determine a second clustering model corresponding to a set of plurality of users whose populace feature vectors are similar to that of the target user as the second clustering model of the target user. Detailed descriptions regarding the determination of the second clustering model may be found elsewhere in the present disclosure (e.g., FIG. 6, and the descriptions thereof).

In 440, the processing engine 112 (e.g. the product flow chart determination module 840) may determine a product flow chart corresponding to the target user based on the clustering model and the current travel information. In some embodiments, the product flow chart may be determined based on travel information of users associated with a city, wherein the users are of the same clustering model. For example, the processing engine 112 may determine a city corresponding to the target user based on the current travel information. The processing engine 112 may obtain a product flow chart corresponding to the target user based on the city, wherein the product flow chart is determined based on the historical travel information or the social information of users of the same clustering model as the target user. The product flow chart may include a plurality of nodes and a plurality of edges. A node may be a point. An edge may be a directed line segment joining two nodes. For two nodes A and B, there may be two edges, one being a directed line segment starting at node A and moving in the direction of node B, one being a directed line segment starting at node B and moving in the direction of node A. The node at which a directed line segment starting at may be refer to as a starting node, and the node to which a directed line segment moving may be refer to as an ending node. Alternatively, a directed line segment may move to itself. Each of the plurality of node may represent a transportation product (e.g., an express, a hitchhiking, a taxi, a special car). Each node may have a value, wherein the value represents a corresponding acceptance rate of the transportation product. The acceptance rate of a transportation product may refer to a ratio of a number (count) of orders for the transportation product to a sum of a number (count) of orders for the transportation product and a number (count) of unaccepted requests for the transportation product.

Each edge may have a weight, wherein the weight represents a user historical transfer rate. In some embodiments, after a first request is not accepted by any service provider, a service requester may initiate a second request. The initiation of the second request may be referred to as a transfer. For the transfer, the service requester may request for the same transportation product or for another transportation product. When the service requester requests for the same transportation product in the second request, an edge starting at and moving in the direction of the same node may be created. The user historical transfer rate may be configured to evaluate the transfer from a transportation product represented by a starting node of an edge to a transportation product represented by an ending node of the edge. For example, the user historical transfer rate corresponding to an edge may include a ratio of a number (count) of orders for a transportation product represented by the ending point of the edge, the orders generated based on second requests for the transportation product represented by the ending point, to a number (count) of the second requests for the transportation product represented by the ending point, wherein the first requests with respect to the second requests are for a transportation product represented by the starting point of the edge. The user historical transfer rate may include a positive transfer rate and a negative transfer rate. As used herein, a positive transfer rate may be, after a (first) request has been transferred from a first transportation product to a second transportation product, the possibility that an order is generated based on the transferred (second) request is higher than the possibility that the order is not generated. A negative transfer rate may be, after a (first) request has been transferred from a first transportation product to a second transportation product, the possibility that an order is not generated is higher than the possibility that the order is generated based on the transferred (second) request. More descriptions regarding the product flow chart may be found elsewhere in the disclosure. See, e.g., FIG. 7 and the descriptions thereof.

In 450, the processing engine 112 (e.g., the shortest path determination module 850) may determine a shortest path of the cluster based on the product flow chart corresponding to the target user. The processing engine 112 (e.g., the transportation means determination module 860) may recommend a transportation means to the target user based on the shortest path of the cluster. The processing engine 112 may determine the shortest path of a cluster based on the values of the plurality of nodes and the values of the weights of the plurality of edges.

In some embodiments, the processing engine 112 may obtain a real-time supply and demand of the transportation product of a city (e.g., where the pick-up location is), and update the values of the plurality of nodes and the weights of the plurality of edges of the product flow chart based on the product acceptance rates and the user history transfer rates, respectively. The processing engine 112 may determine a plurality of shortest paths corresponding to at least portion of the plurality of nodes from the updated product flow chart based on a Shortest Path Faster Algorithm (SPFA). The processing engine 112 may determine a strategy set based on the plurality of shortest paths. The processing engine 112 may recommend a transportation means and/or a transportation product to the target user based on the strategy set and the current travel information (e.g., a current transportation means).

Alternatively, instead of a strategy set, the processing engine 112 may determine a first node (e.g., the node corresponding to the current transportation means and/or the transportation product selected by the target user) in the updated product flow chart, and determine a shortest path of the first node using the SPFA. The processing engine 112 may recommend the transportation means to the target user based on the shortest path of the first node. The shortest path may point to a second node, which may be referred to as a first reachable destination of the first node. The transportation product indicated by the first reachable destination may be a transportation means to be recommended to the user.

The SPFA may be a queue optimization based on the Bellman-Ford algorithm. THE SPFA was published by Duan Fanding of Southwestern Jiaotong University in "Journal of Southwest Jiaotong University" issued in 02, 1994. The SPFA may be used to process graphs with negative weights. The SPFA may be optimized using a queue to avoid redundant calculations. The queue may be used to store candidate vertices. Specifically, if the shortest path of a vertex v (e.g., a node of the product flow chart) is changed, the vertex may be added to the queue. In the next time, edges starting from the vertex to all adjacent vertices may be traversed to perform a slack operation, and only the edges which have updated the shortest path may be enqueued. The slack operation may refer to that for each vertex of the product flow chart, an attribute d(v) may be set to describe the upper bound of the weight on the shortest path from a node s to the vertex v, which may be called a shortest-path estimate. As used herein, the upper bound may refer to a special element related to a partial order set. The special element may be an element in the partial order set that is greater than or equal to all elements in its subset. For each optimization, the node at the head of the queue may be taken out, and the slack operation may be performed successively on ending vertice of all edges starting from the node. The estimated value of the shortest path may be gradually replaced by a more accurate value obtained by the slack operation. An optimal solution may be obtained when the queue is empty. In some embodiments, a SPFA model may determine the shortest paths of the plurality of nodes on the product flow chart one by one. In some embodiments, the SPFA model may preferentially determine the shortest path of the node representing the current transportation means of the product flow chart. In some embodiments, the SPFA model may be implemented using pseudo code. Exemplary specific pseudo code may include:

```
-for each vertex v≠s in V(G)
    -d(v):=∞
-d(s):=0
-offer s into Q
-while Q is not empty
    -u:=poll Q
    -for each edge(u,v)in E(G)
    -if d(u)+w(u,v)<d(v)then
        -d(v):=d(u)+w(u,v)
        -if v is not in Q then
        -offer v into Q
``` wherein, v denotes any node, s denotes a node other than v, V(G) denotes the plurality of nodes of the product flow chart, d(v) denotes the lengths of the shortest paths from v to other node s, Q denotes a first-in, first-out queue for storing candidate nodes, (u, v) denotes an edge associated with the node v, E(G) denotes the plurality of edges of the product flow chart, w(u, v) denotes the weight of the edge (u, v). For any node v, all of its paths may be ranked according to information in d(v). The edge with the shortest distance and the node it points to may be kept.

The shorter the path, the more the node (the first reachable destination) that the path directed to, that is, the transportation product, may satisfies the request of the target user. In some embodiments, the satisfying the request of the target user may refer to that when a first request of the target user is not accepted, a request associated with other transportation products the target user being familiar with and determined based on a transportation product of the first request, may be accepted. The target user may be properly guided to generate a transportation service request for using a transportation product with a higher probability to be accepted based on the target user's preferences (with a familiar transportation product). In some embodiments, the satisfying the request of the target user may refer to that, search for users who have similar social information to the target user according to the social information of the target user, and recommend a transportation product he/she may like, to the target user, to improve the user experience based on the historical travel information of the users who have similar social information to the target user. The transportation product that the target user may like may be determined according to the count of requests of each transportation product and the count of trips of each transportation product, of the users who have similar social information to the target user. For example, the transportation product that the target user may like may be a transportation product with a per capita count of trips greater than a trip threshold. For another example, the transportation product that the target user may like may be a transportation product with a per capita count of requests greater than a request threshold.

In some embodiments, the product flow chart may be omitted. The processing engine 112 may directly obtain the strategy set corresponding to the target user based on the clustering model and the travel information without referring to the product flow chart. The processing engine 112 may recommend the transportation means to the user in real time based on the strategy set to quickly satisfy the transportation service requests of the user. The strategy set may be determined in advance based on a product flow chart and stored in a storage device (e.g., the storage 150).

The processing engine 112 may determine the strategy set based on the clustering model and the travel information. The processing engine 112 may determine the current transportation means of the target user based on the travel information. The processing engine 112 may determine the first node based on the current transportation means. The processing engine 112 may determine the shortest path of the first node and the node the shortest path directed to (the first reachable destination) based on the strategy set. The processing engine 112 may recommend the transportation means to the target user based on the node the shortest path directed to (the first reachable destination).

In some embodiments, the processing engine 112 may determine the strategy set based on the product flow chart. For each node, the processing engine 112 may determine a shortest path and/or a node the shortest path directed to (the first reachable destination) based on the shortest path in the product flow chart using the shortest path algorithm. The processing engine 112 may determine the strategy set based on the plurality of shortest paths corresponding to the plurality of nodes and a plurality of first reachable destinations corresponding to the plurality of nodes. The processing engine 112 may further store the strategy set to storage device(s) of any other device or module in transportation means recommending system 100 (e.g., the storage 150) through the communication port (e.g., the communication port 240).

Further, the transportation means recommending system 100 may provide the transportation means determined in the operation 450 to the transportation platform in the form of information for dispatching and arranging vehicles to further optimize the capacity of the traffic system and/or the transportation platform. In addition, the transportation means recommending system 100 may also display the transportation means determined in the operation 450 in a display device (not shown), or send the transportation means determined in the operation 450 to the target user (e.g., the requester terminal 130) in the form of a text message to accurately satisfy the personalized transportation service requests of the target user. In addition, the clustering models may be updated (e.g., the clustering model may be updated at certain intervals (e.g., weekly, monthly)) based on updated historical travel information and updated social information. Accordingly, the product flow chart may also be updated (e.g., the product flow chart may be updated at the certain intervals (e.g., weekly, monthly)). The accuracy of the recommended transportation means may be greatly improved using the updated product flow chart.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional operations (e.g., a storing operation) may be added elsewhere in the exemplary process 400. In the storing operation, the processing engine 112 may store the social information, the travel information, the user type, the clustering model, the product flow chart, and/or the shortest path in any storage device (e.g., the storage 150) disclosed elsewhere in the present disclosure.

The embodiment may include the following beneficial effects:

First, a model for transportation means recommendation based on the transportation products may be provided. The model may be determined based on historical travel records, the user type, and the similarities between different transportation products. Further, the space-time environment (e.g., the supply and demand of the transportation products) when transportation service requests are generated may be reasonably considered to satisfy the personalized transportation service requests of the users.

Second, a transportation means may be recommended to a user by determining a transportation product with the highest transfer rate based on the product flow chart and the current transportation means requested by the user. The product flow chart may be configured to describe transportation means selections of the users, with the transportation products as the plurality of nodes, the product acceptance rates as the values of the plurality of nodes, and the user history transfer rate as the weights of the edges. The recommendation based on the product flow chart may increase a satisfaction rate of users by providing the right transportation product for users. Based on the historical transportation service requests and the real-time supply and demand of each transportation product near the pick-up location, transportation products with the highest transfer rates may be recommended to the users.

Third, the Shortest Path Faster Algorithm may be used to identify and eliminate negative paths of the product flow chart, that is, edges with negative weights, to increase processing efficiency. To determine the shortest path, the space-time environment may be further considered, and the shortest path may be dynamically optimized according to the acceptance rates of the real-time updated transportation products.

Figure 5:
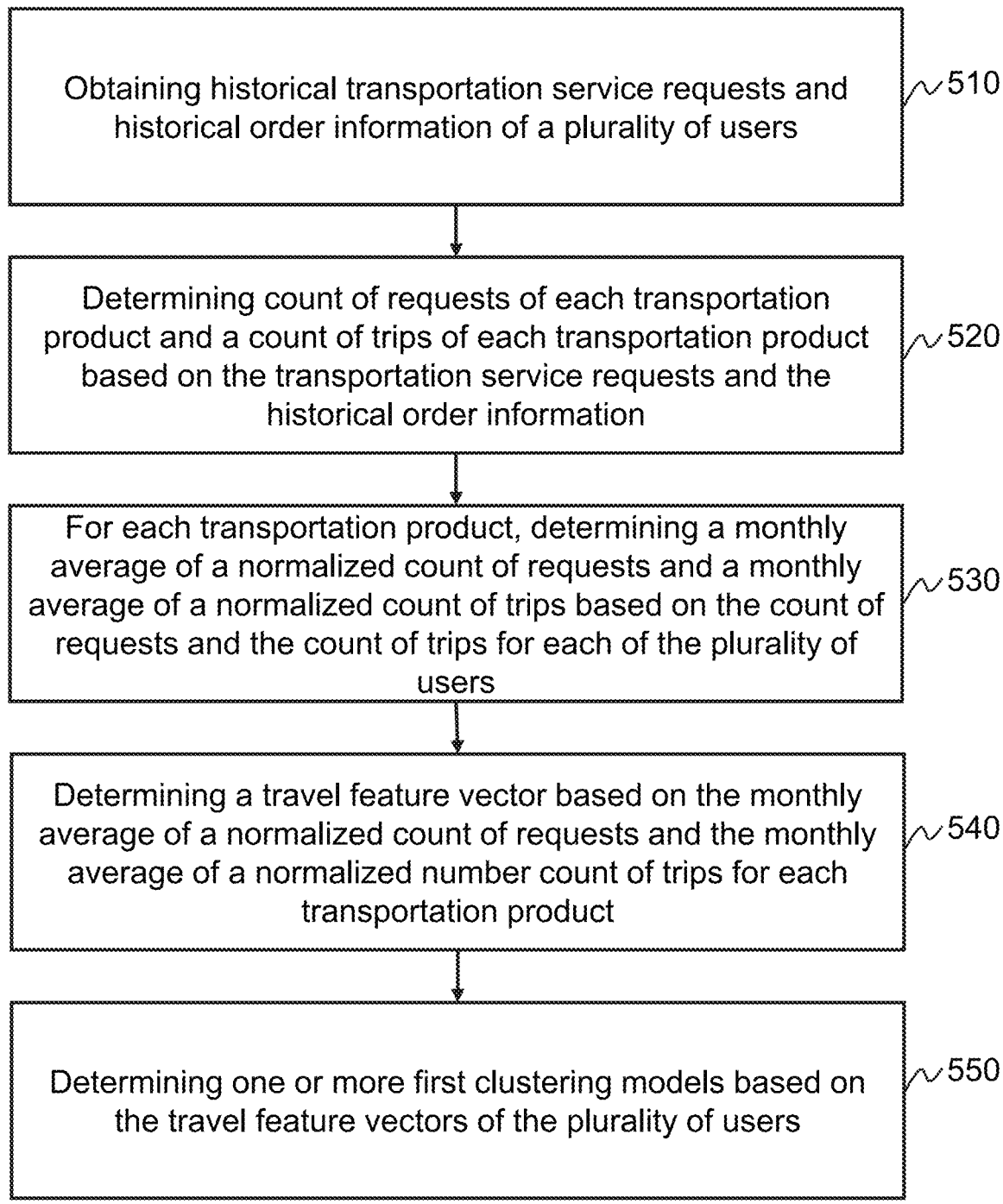
FIG. 5 is a flowchart illustrating an exemplary process for one or more first clustering models determining according to some embodiments of the present disclosure.

FIG. 5 is a flowchart illustrating an exemplary process for one or more first clustering models determining according to some embodiments of the present disclosure. The process 500 may be executed by the transportation means recommending system 100. For example, the process 500 may be implemented as a set of instructions (e.g., an application) stored in the storage ROM 230 or RAM 240. The processor 220 and/or modules in the FIGS. 8-9 may execute the set of instructions, and when executing the instructions, the processor 220 and/or the modules may be configured to perform the process 500. The operations of the illustrated process presented below are intended to be illustrative. In some embodiments, the process 500 may be accomplished with one or more additional operations not described and/or without one or more of the operations discussed. Additionally, the order in which the operations of the process as illustrated in FIG. 5 and described below is not intended to be limiting.

In 510, the processing engine 112 (e.g., the obtaining module 910) may obtain historical transportation service requests and historical order information of a plurality of users. The historical transportation service requests and the historical order information may refer to transportation service requests and order information within a preset time period. The preset time period may be last three days, last seven days, last month, last year. Therefore, the historical transportation service requests and the historical order information in the preset time period may be the transportation service requests and order information in last three days, the transportation service requests and order information in last seven days, the transportation service requests and order information in last one month, and the transportation service requests and order information in last one year.

In some embodiments, when a user is in need of a transportation service, he or she may log in the transportation service application and then select a transportation product according to his or her preferences and initiate a transportation service request. Based on a complex background logic and current supply and demand, the request may be accepted, or unsatisfied. If the request is not accepted, the user may need to initiate another request by, for example, raising the price of the transportation service, or changing a transportation means. For the user, the requesting may occur multiple times until a request is accepted or the user gives up. The requesting may generate a plurality of user selection behaviors. The plurality of user selection behaviors may reflect the historical transportation service request situation of the user.

In 520, the processing engine 112 (e.g., the clustering module 920) may determine a count of requests of each transportation product and a count of trips of each transportation product based on the transportation service requests and the historical order information. The transportation products may include an express, a hitchhiking, a taxi, a special car, or the like, or any combination thereof. As used herein, a count of requests of a transportation product may be the number (count) of requests for a transportation service for using the transportation product (including unaccepted requests and (completed) orders). A count of trips of a transportation product may be the number (count) of orders using the transportation product, that is, the number (count) of requests for using the transportation product that have been accepted. For example, for a user initiating 30 transportation service requests for the express between Jan.

1, 2016 and Dec. 31, 2016, and 23 of which being accepted, the count of requests for using the express of the user in 2016 is 30 times, and the count of trips of the express is 23 times.

In 530, for each transportation product, the processing engine 112 (e.g., the clustering module 920) may determine a monthly average of a normalized count of requests and a monthly average of a normalized count of trips based on the count of requests and the count of trips for each of the plurality of users.

For each transportation product and for each of the plurality of users, the processing engine 112 may average a count of requests and a count of trips based on a monthly dimension (e.g., 30 days), and determine a monthly average of the count of requests and a monthly average of the count of trips.

For each transportation product and for each of the plurality of users, the processing engine 112 may normalize the monthly averaged count of requests and the monthly averaged count of trips, and determine the monthly average of a normalized count of requests and the monthly average of a normalized count of trips.

In 540, for each of the plurality of users, the processing engine 112 (e.g., the clustering module 920) may determine a travel feature vector based on the monthly average of a normalized count of requests and the monthly average of a normalized count of trips for each transportation product. The travel feature vector of a user may be used to indicate transportation preferences of the user. For example, each element of the travel feature vector may be related to a transportation product, wherein an element may indicate a relationship between the monthly average of a normalized count of requests for the transportation product and the monthly average of a normalized count of trips for the transportation product.

In 550, the processing engine 112 (e.g., the clustering module 920) may determine one or more first clustering models based on the travel feature vectors of the plurality of users. Users with similar travel feature vectors may have similar transportation preferences. The processing engine 112 may cluster users with similar travel feature vectors into a same first clustering model (also refer to as a first cluster).

In some embodiments, the processing engine 112 may cluster the users using an X means algorithm, wherein X denotes the number (count) of clusters (also referred to as clustering models). The processing engine 112 may set a value range of X for the X means algorithm, including the maximum value and the minimum value. The maximum value and the minimum value may be set by the transportation means recommending system 100, or may be adjusted according to actual situations. For example, the minimum value may be 1, 3, 5, etc. The maximum value may be 50, 60, 70, etc. In some embodiments, the value of X of the first clusters may be 1.5 times, 2 times, 2.5 times, 3 times, etc. of the number (count) of the transportation products.

The X means algorithm may be an improvement of a K means algorithm. Unlike the K means algorithm, which needs the number of clusters to be set, the X means algorithm may determine the number of clusters by itself after determining the value range of X, and automatically determine an optimal number of clusters within the value range. Moreover, the processing engine 112 may use a Bayesian Information Criterion (BIC) to help select the best value in the value range. For example, the processing engine 112 may execute a K means clustering starting from the minimum value to generate a plurality of cluster in the first iteration. The processing engine 112 may determine whether to continue splitting each cluster in the next iteration based on the BIC of the current iteration. An initial state of the BIC may be set by the transportation means recommending system 100, or may be adjusted according to actual conditions. The processing engine 112 may continuously iterate the above process to update the BIC in each time, and automatically add one to the value of X. The processing engine 112 may terminate the process when the value of X reaches the maximum value or when all the current clusters are determined not need to be split according to the BIC. The processing engine 112 may output the value of X as the number (count) of clusters (also referred to as clustering models) and corresponding users of each clustering models.

Further, as the historical transportation service requests and historical order information are updated, the one or more first clustering models may be updated accordingly. For example, the first clustering models may be updated at certain intervals (e.g., weekly, monthly).

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional operations (e.g., a storing operation) may be added elsewhere in the exemplary process 500. In the storing operation, the processing engine 112 may store the count of requests of each transportation product and the count of trips of each transportation product, the travel feature vector, the first clustering models in any storage device (e.g., the storage 150) disclosed elsewhere in the present disclosure.

Figure 6:
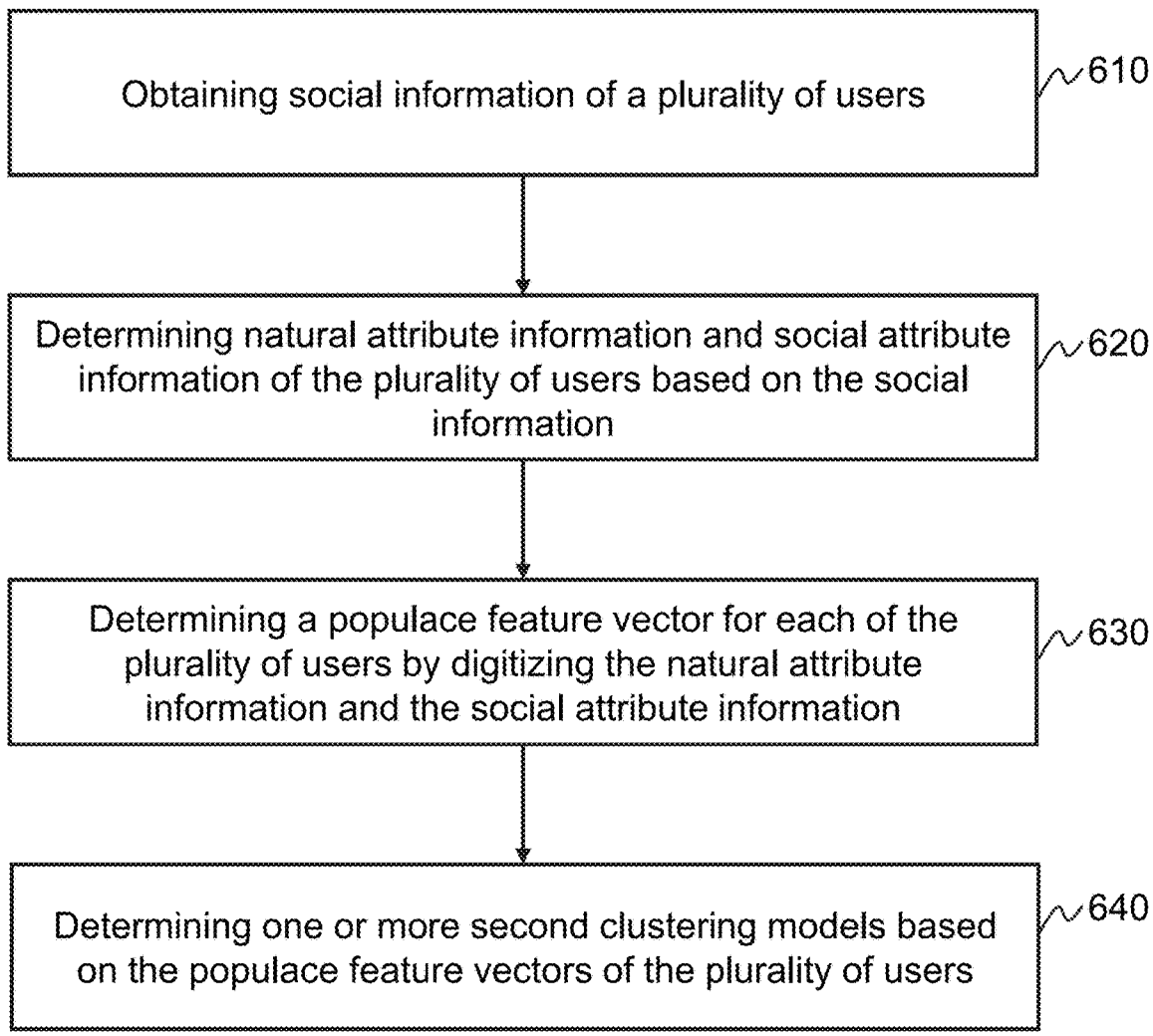
FIG. 6 is a flowchart illustrating an exemplary process for one or more first clustering models determining according to some embodiments of the present disclosure.

FIG. 6 is a flowchart illustrating an exemplary process for one or more first clustering models determining according to some embodiments of the present disclosure. The process 600 may be executed by the transportation means recommending system 100. For example, the process 600 may be implemented as a set of instructions (e.g., an application) stored in the storage ROM 230 or RAM 240. The processor 220 and/or modules in the FIGS. 8-9 may execute the set of instructions, and when executing the instructions, the processor 220 and/or the modules may be configured to perform the process 600. The operations of the illustrated process presented below are intended to be illustrative. In some embodiments, the process 600 may be accomplished with one or more additional operations not described and/or without one or more of the operations discussed. Additionally, the order in which the operations of the process as illustrated in FIG. 6 and described below is not intended to be limiting.

In 610, the processing engine 112 (e.g., the obtaining module 910) may obtain social information of a plurality of users, wherein the social information of a user may include natural attribute information of the user and social attribute information of the user.

In 620, the processing engine 112 (e.g., the clustering model 920) may determine natural attribute information and social attribute information of the plurality of users based on the social information of the plurality of users. The natural attribute information may include a gender, an age, or the like, or any combination thereof. The social attribute information may include an occupation, an income, or the like, or any combination thereof.

In 630, the processing engine 112 (e.g., the clustering model 920) may determine a populace feature vector for each of the plurality of users by digitizing the natural attribute information and the social attribute information.

The digitizing may be similar to that described in FIG. 5 and may not be described herein. The populace feature vector may be used to indicate transportation preferences of a user.

In 640, the processing engine 112 (e.g., the clustering model 920) may determine one or more second clustering models based on the populace feature vectors of the plurality of users. Users with similar populace feature vectors may have similar transportation preferences. The processing engine 112 may cluster users with similar populace feature vectors into a same second clustering model (also refer to as a second cluster).

In some embodiments, the users may be clustered based on the X means algorithm. In some embodiments, the value of X of the second clustering model may be 20, 30, 40, 50. The X means algorithm has been described in detail in FIG. 5 and may not be described herein. It should be noted that the first clustering model and the second clustering model may be the same except for data that constructs the feature vectors. The difference in the data means that the two models may be configured to deal with different users, but there may be overlaps between users of the one or more first clustering models and users of the one or more second clustering models. In some embodiments, users of the one or more second clustering models may include the users of the one or more second clustering models. When the historical travel information of the target user is insufficient, the processing engine 112 may determine similarities between the target user and the plurality of users based on the social information of the target user and the social information of the plurality of users. The processing engine 112 may recommend a transportation means to the target user based on transportation preferences of users with similarity to the target user. The applicable range of the transportation means recommending system 100 may be expanded. The second clustering model, determined based on historical data of the transportation service APP (e.g., the historical travel information, the social information) may effectively fill in the gaps of the inability to recommend transportation means accurately for relatively new users, that is, users with insufficient historical travel information.

Further, as the historical transportation service requests and historical order information are updated, the one or more second clustering models may be updated accordingly. For example, the second clustering models may be updated at certain intervals (e.g., weekly, monthly).

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional operations (e.g., a storing operation) may be added elsewhere in the exemplary process 600. In the storing operation, the processing engine 112 may store the populace feature vectors, and the one or more second clustering models in any storage device (e.g., the storage 150) disclosed elsewhere in the present disclosure.

FIG. 7 is a flowchart illustrating an exemplary process for product flow chart determining according to some embodiments of the present disclosure. The process 700 may be executed by the transportation means recommending system 100. For example, the process 700 may be implemented as a set of instructions (e.g., an application) stored in the storage ROM 230 or RAM 240. The processor 220 and/or modules in the FIGS. 8-9 may execute the set of instructions, and when executing the instructions, the processor 220 and/or the modules may be configured to perform the process 700. The operations of the illustrated process presented below are intended to be illustrative. In some embodiments, the process 700 may be accomplished with one or more additional operations not described and/or without one or more of the operations discussed. Additionally, the order in which the operations of the process as illustrated in FIG. 7 and described below is not intended to be limiting.

In 710, the processing engine 112 (e.g., the obtaining module 910) may obtain historical travel information of a set of users of a same clustering model (e.g., a first clustering model, a second clustering model), wherein the historical travel information is related to a transportation city. For example, the processing engine 112 may obtain historical travel information related to Shanghai. The historical travel information related to Shanghai may be historical travel information with pick-up location information including Shanghai, for example, an order with a pick-up location in Shanghai. The historical travel information related to Shanghai may be historical travel information with destination information includes Shanghai, for example, an order with destination in Shanghai. The historical travel information related to Shanghai may be historical travel information with a route passes through Shanghai. Alternatively, the transportation city may be a district, a predetermined geographic region with a certain radius (e.g., 500 m, 1 km, 5 km, 10 km) from a predetermined center location, etc. The set of users may have similar travel feature vectors or populace feature vectors.

The processing engine 112 may determine a product flow chart based on the historical travel information of the set of users. Considering the differences between different transportation products, the number (count) of the transportation products, and the differences between supply and demands of the transportation products in different cities, it is necessary to take the cities into account when determining a product flow chart. In some embodiments, for the same transportation product, there may be two different types of real-time and reserved requests, which may be further subdivided.

In 720, the processing engine 112 (e.g., the product flow chart construction module 930) may determine transportation products based on the historical travel information of the set of users. The transportation products may include a taxi, a hitchhiking, an express, a special car, or the like, or any combination thereof.

In 730, the processing engine 112 (e.g., the product flow chart construction module 930) may determine an acceptance rate for each transportation product and user historical transfer rates for each transportation product based on the historical travel information. The acceptance rate of a transportation product may refer to a ratio of a number (count) of accepted requests for the transportation product to a sum of a number (count) of accepted requests for the transportation product and a number (count) of unaccepted requests for the transportation product. For example, there are 50 requests for using a taxi, and 23 of them are accepted, the acceptance rate of the taxi may be 46%. The user historical transfer rate may be configured to evaluate a transfer from a first transportation product to a second transportation product. As used herein, the first transportation product and the second transportation product may be used to describe the direction of the transfer, not referring to any particular transportation products. The first transportation product may be the same as or different from the second transportation product. The user historical transfer rate may include a ratio of a number (count) of orders for the second transportation product, the orders generated based on second requests for the second transportation product, to a number (count) of the second requests for the transportation product represented by the ending point, wherein the first requests with respect to the second requests are for the first transportation product. The processing engine 112 may determine the user history transfer rates based on transfer rates among the transportation products.

The processing engine 112 may determine requesting behavior initiated a user. For example, a requesting behavior may be, after two unaccepted transportation service request for the taxi initiated by the user Ci, a third request transferring to the express initiated by the user Ci has been accepted.

Based on the requesting behavior of the user Ci, the processing engine 112 may update the count of requests related to the first transportation product and the second transportation product and the count of orders related to the first transportation product and the second transportation product. For example, the processing engine 112 may increase the count of requests of taxi to taxi by one, decrease the corresponding count of orders of taxi to taxi by one. The processing engine 112 may increase the count of requests of taxi to express by one, and increase the corresponding count of orders of taxi to express by one.

The processing engine 112 may determine the user historical transfer rates based on a count of requests related to the first transportation product and the second transportation product and a count of orders related to the first transportation product and the second transportation product of each transportation product. As used herein, the first transportation product and the second transportation product may be used to describe the direction of the transfer, not referring to any particular transportation products.

In some embodiments, the number (count) of a transfer behavior set Rs from the first transportation product to the second transportation product may be related to the number (count) of transportation products. Assuming the number (count) of the transportation products is b, the number (count) of the transfer behavior set Rs may be $b*(b+1)$. The transfer behavior set Rs may include transfers between the same transportation product (e.g., from a transportation product bi to the transportation product bi), the number (count) of which being b, and transfers between different transportation products (e.g., from the transportation product bi to a transportation product bj, the number (count) of which being $b*(b-1)/2$. The total number of transfers may be combined as $b*(b+1)/2$. In some embodiments, considering both real-time and reserved requests, the total number may be $2b*(2b+1)$. A reserved request may be refer to a request that is initiated in advance of the pick-up time point. The processing engine 112 may evaluate the transfers. The processing engine 112 may determine a current transfer rate to be 1 if a request is accepted after the current transfer; otherwise, processing engine 112 may determine a current transfer rate to be −1. A transfer may be expressed as (bi, bj, ±1). In each cluster determined based on a first clustering model or a second clustering model, the total number of transfers of transportation products may be $2b*(2b+1)$, which may increase in a square trend as the transportation products increases.

In 740, the processing engine 112 (e.g., (e.g., the product flow chart construction module 930) may determine a product flow chart of the transportation city based on the transportation products, the acceptance rates of the transportation products, and the user historical transfer rates of the transportation products. The processing engine 112 may determine the plurality of nodes of the product flow chart based on the transportation products. The processing engine 112 may determine values of the plurality of nodes based on the acceptance rates. The processing engine 112 may determine the plurality of edges based on the transfers. The processing engine 112 may determine weights of edges of the product flow chart based on the user historical transfer rates.

Figure 11:
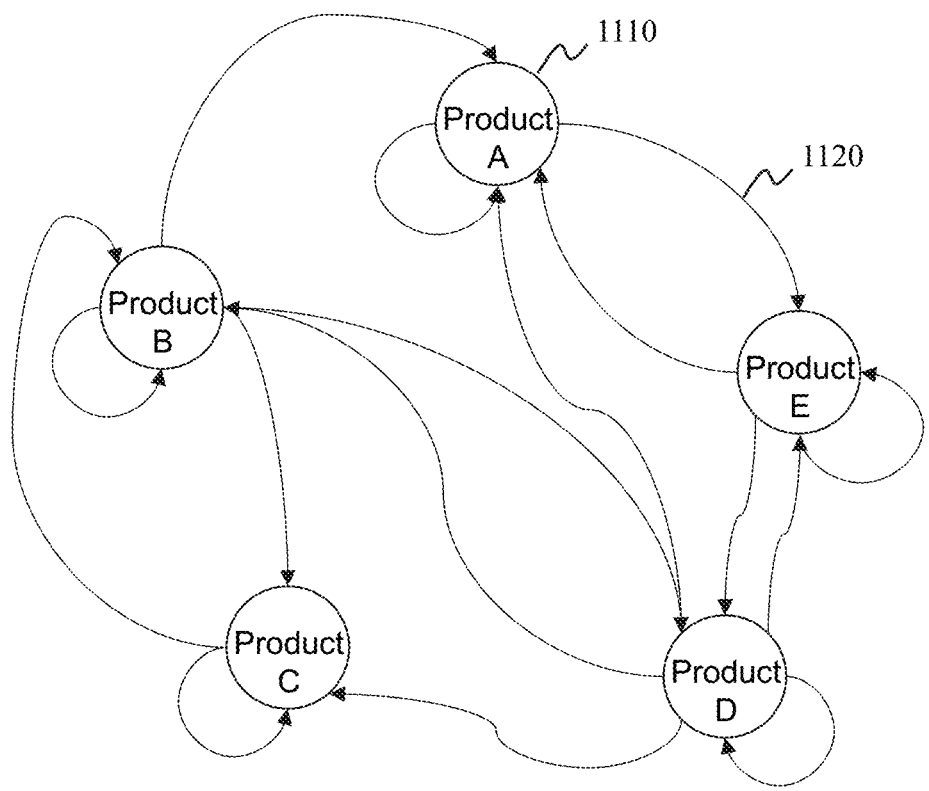
FIG. 11 is a schematic diagram illustrating an exemplary product flow chart according to some embodiments of the present disclosure.

FIG. 11 is a schematic diagram illustrating an exemplary product flow chart according to some embodiments of the present disclosure. Generally, a product flow chart may be a graph. The graph may include a plurality of vertices (also referred to as nodes herein) (e.g., node 1110) and a plurality of edges (e.g., edge 1120). The number of the plurality of vertices and the number of the plurality of edges may be two or more. A vertex of the product flow chart may represent one of the transportation products, and an edge may represent a "relationship" between a pair of related transportation products in the transportation products. Each of the plurality of edges may be associated with a weight serving as a metric of the strength of the "relationship". Depending on the problem to be solved with the graph, vertices and edges of the graph may have various actual meanings.

In the present disclosure, a vertex of a graph may represent a transportation product (e.g., Product A to Product E illustrated in FIG. 11). For example, the graph may include a look-up table and/or a mapping function to label each vertex (i.e., to build an association between the each vertex and the corresponding transportation product). An edge of a graph may represent a transfer from a first request for using a first transportation product represented by a vertex connected by the edge to a second request for using a second transportation product represented by another vertex connected by the edge. Each edge of a graph may has a weight associated with at least the number (count) of the transfers represented by the edge. For example, the weight may be a measure of the amount of transfers represented by the corresponding edge, such as the total number (count) of transfers represented by the edge. It is understood that, the number of vertices (or transport products) may be set based on the travel information or according to actual needs, and is not limited to five as illustrated in FIG. 11. In some embodiments, the number of vertices may be in a range of [2, 15].

In the present disclosure, the product flow chart may be a directed cyclic graph. The directed may refer to that the transfer of product A to product B being A->B, and the transfer of product B to product A being B->A. An edge (or be referred to as a directed edge) of a directed graph may further include information on directions of the associated transfer. The cyclic may refer to that a transportation product selected in the first request may be reselected after one or more transfers. For example, the simplest cycle may be the transfer of product A to product A, that is, a continuous transportation service requests for product A.

In some embodiments, an acceptance rate of a transportation product may refer to a real-time acceptance rate of the transportation product. The processing engine 112 may determine the real-time acceptance rate of the transportation product according to the real-time supply and demand the transportation product in the city.

The processing engine 112 may determine the plurality of edges and the weights of the plurality of edges of the product flow chart based on the (bi, bj, ±1). The processing engine 112 may determine a set of (bi, bj, $\Sigma \pm 1/\Sigma$), wherein $\Sigma$ denotes a number (count) of transfers from the transportation product bi to the transportation product bj (also referred to as transfers from bi to bj), and $\Sigma \pm 1/\Sigma$ denotes a user historical transfer rate determined based on the transfers from bi to bj. The value range of $\Sigma\pm1/\Sigma$ may be $[-1, +1]$. A value of +1 means that all of the transfers from bi to bj of the cluster are successful, and a value of −1 means that all of the transfers from bi to bj of the cluster are unsuccessful. A successful transfer from bi to bj may refer to that a first request for transportation product bi has not been accepted and a second request of the first request has been accepted, the second request being for transportation product bj. A unsuccessful transfer from bi to bj may refer to that a first request for transportation product bi has not been accepted and a second request of the first request has not been accepted either, the second request being for transportation product bj. It should be noted while the transfers from bi to bj are used herein, transfers from bi to bi may be also included in the product flow chart.

The processing engine 112 may determine a weight matrix W based on the set of (bi, bj, $\Sigma\pm1/\Sigma$), wherein the weight matrix W may be an asymmetric matrix, and a lattice Mij representing $\Sigma\pm1/\Sigma$ of (bi, bj, $\Sigma\pm1/\Sigma$) denotes a user historical transfer rate related to the transfers from the transportation product bi to the transportation product bj. The processing engine 112 may determine the value of the lattice Mij as the value of the weight of an edge corresponding to a transfer from bi to bj. The value of the lattice Mij may be between −1 and 1. Alternatively, the value of the lattice Mij may be null, indicating users of the cluster do not have the transfers corresponding to the (bi, bj, $\Sigma\pm1/\Sigma$).

In some embodiments, in order to further simplify the calculation, the processing engine 112 may screen the weight matrix W based on a matrix transferring threshold. The processing engine 112 may screen the weight matrix W by determining whether the value of $\Sigma$ of a lattice is greater than or equal to the matrix transferring threshold. The matrix transferring threshold may be set by the transportation means recommending system 100, or may be adjusted according to actual conditions. For example, the matrix transferring threshold may be $\frac{1}{3}$, $\frac{1}{4}$, $\frac{1}{5}$, of a number (count) of users of the cluster.

In response to determining that the value of $\Sigma$ of a lattice is greater than or equal to the matrix transferring threshold, the processing engine 112 may retain the value of the lattice. In response to determining that the value of $\Sigma$ of the lattice is less than the matrix transferring threshold, the processing engine 112 may set the value of the lattice to be null. The users of the cluster may be considered to have no such transfers. Accordingly, a corresponding edge may not be included in the product flow chart.

In some embodiments, when calculating the shortest path based on the product flow chart, the processing engine 112 may determine the weights of the plurality of edges first. When the value of a weight of an edge is positive, indicating that a number (count) of failures of the transfer corresponding to the edge is less than the number (count) of successes, the processing engine 112 may determine that the transfer is to be recommended. When the value of a weight of an edge is negative or null, indicating that a number (count) of failures of the transfer corresponding to the edge is greater than or equal to the number (count) of successes, the processing engine 112 may determine that the transfer is not to be recommended. The processing engine 112 may delete edges with negative weights and/or null weights. The number (count) of paths that need to be calculated within a cluster may be further reduced after the deletions.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional operations (e.g., a storing operation) may be added elsewhere in the exemplary process 700. In the storing operation, the processing engine 112 may store the product flow chart, the acceptance rate, the user historical transfer rate, in any storage device (e.g., the storage 150) disclosed elsewhere in the present disclosure.

Figure 8:
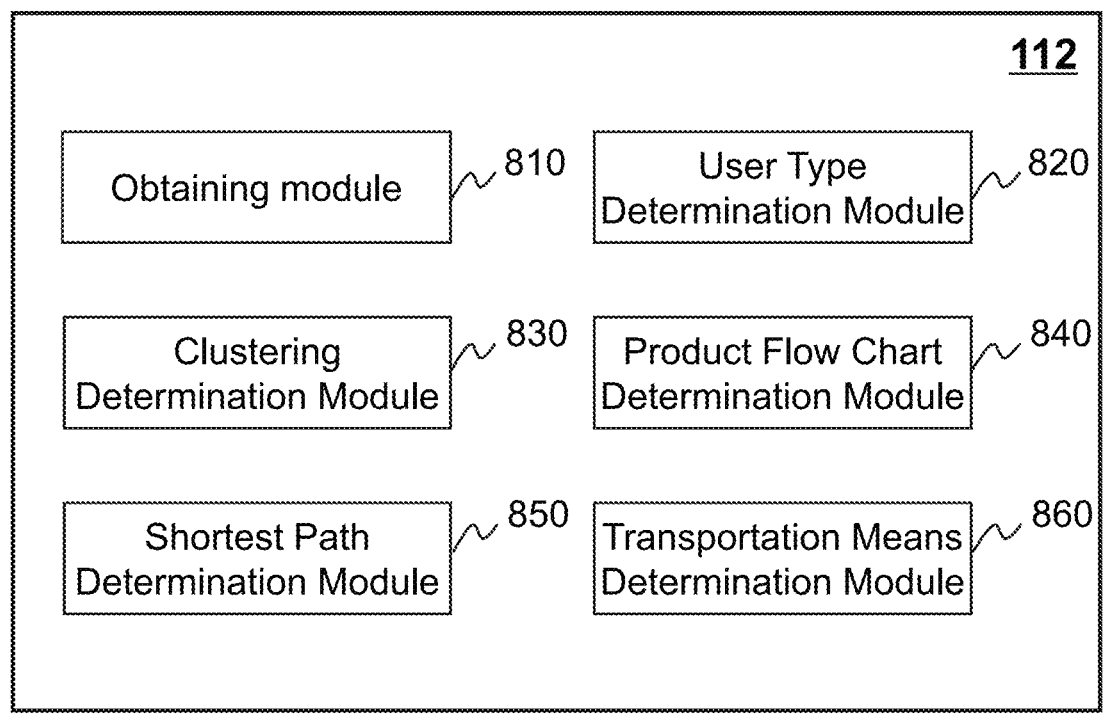
FIG. 8 is a block diagram illustrating an exemplary transportation means recommending system according to some embodiments of the present disclosure.

FIG. 8 is a block diagram illustrating an exemplary transportation means recommending system according to some embodiments of the present disclosure. The processing engine 112 may include an obtaining module 810, a user type determination module 820, a clustering model determination module 830, a product flow chart determination module 840, a shortest path determination module 850, and a transportation means recommendation module 860.

The obtaining module 810 may be configured to obtain travel information and social information of a target user. The travel information of the target user may include current travel information of the target user and travel information of the target user in a preset time period (also referred to as historical travel information). The preset time period may be last one month, last three months, last half a year, etc. The travel information may include pick-up location information, destination information, a pick-up time point, a transportation means, a route, etc. The social information of the target user may include natural attribute information and social attribute information. The natural attribute information may include a gender, an age, etc. The social attribute information may include an occupation, an income, etc. The obtaining module 810 may include a first obtaining unit and a second obtaining unit. The first obtaining unit may be configured to obtain the current travel information of the target user. The second obtaining unit is configured to obtain the social information and the historical travel information of the target user.

The user type determination module 820 may be configured to determine a user type based on the historical travel information of the target user. The user type may be a first type or a second type.

The clustering model determination module 830 may be configured to determine a clustering model based on the historical travel information and/or the social information of the target user. The clustering model determination module 830 may include a first clustering model determination unit and a second clustering model determination unit. The first clustering model determination unit may be configured to, in response to determining that the target user is a user of the first typed, determine a first clustering model of the target user from one or more first clustering models based on the historical travel information. The second clustering model determination unit may be configured to, in response to determining that the target user is a user of the first typed, determine a second clustering model of the target user one or more second clustering models based on the social information.

The product flow chart determination module 840 may be configured to determine a product flow chart based on the clustering model of the target user and the current travel information of the target user.

The shortest path determination module 850 may be configured to determine a shortest path corresponding to a node in a product flow chart. The node the shortest path directed to may be called a first reachable destination.

The transportation means recommendation module 860 may be configured to output a strategy set determined based on a plurality of shortest paths, and then recommend a transportation means for the target user based on the strategy set. The strategy set may include a plurality of shortest paths.

A first node may be determined based on the current transportation product selected by the target user. When a first request of the target user is not accepted, the target user may be properly guided to generate a second request for using a transportation product determined based on a first reachable destination corresponding to the first node. The recommendation of a transportation means may help the transportation platform dispatch and arrange vehicles, further optimizing the capacity of the traffic system and/or the transportation platform.

The modules in the processing engine 112 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units. For example, the processing engine 112 may include a storage module (not shown) configured to store information and/or data (e.g., the product flow chart, the first clustering model, the second clustering model, the shortest path) associated with the driver. As another example, the product flow chart determination module 840 and the shortest path determination module 850 may be combined as a single module which may both determine the product flow chart and the shortest path.

Figure 9:
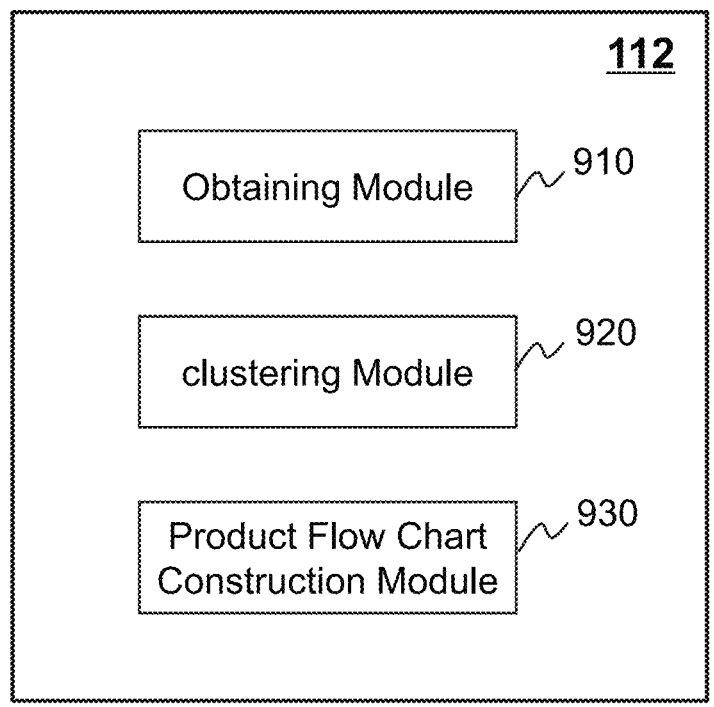
FIG. 9 is a block diagram illustrating an exemplary transportation means recommending system according to some embodiments of the present disclosure.

FIG. 9 is a block diagram illustrating an exemplary transportation means recommending system according to some embodiments of the present disclosure. The processing engine 112 may include an obtaining module 910, a clustering module 920, and a product flow chart construction module 930.

The obtaining module 910 may be configured to obtain social information and historical travel information of a plurality of users.

The clustering module 920 may be configured to determine one or more clustering models based on the historical travel information and/or the social information of the user. The one or more clustering models may include one or more first clustering models and one or more second clustering models. The clustering module 920 may include a first clustering unit and a second clustering unit. The first clustering unit may be configured to determine one or more first clustering models based on the historical travel information. The second clustering unit may be configured to determine one or more second clustering models based on the social information.

The product flow chart construction module 930 may be configured to determine a product flow chart of a cluster based on the historical travel information and the clustering models. The product flow chart of a cluster may be a directed cyclic graph, with transportation products as a plurality of nodes, product acceptance rates as values of the plurality of nodes, and user history transfer rates as weights of a plurality of edges. The product flow chart of a cluster may be related to a clustering model. The product flow chart of a cluster may be associated with a certain city.

The modules in the processing engine 112 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units. For example, the processing engine 112 may include a storage module (not shown) configured to store information and/or data (e.g., the product flow chart, the first clustering model, the second clustering model, the shortest path) associated with the driver. As another example, the clustering module 920 and the product flow chart construction module 930 may be combined as a single module.

FIG. 10 is a schematic diagram illustrating an exemplary weight matrix of a cluster according to some embodiments of the present disclosure.

As shown in FIG. 10, bi represents a transportation product, and the value of a lattice Mij represents a transfer rate from the transportation product bi to a transportation product bj. For example, b1 is a taxi and Bk is an express, a lattice M1$k$ represents the transfer rate from the taxi to the express, and the rate may be 0.67. A lattice Mk1 represents the transfer rate from the express to the taxi, and the rate may be 0.92.

The value of the lattice Mij may be null, positive, zero, or negative. The null may indicate that there is no such transfer. The negative value may indicate that the number (count) of unsuccessful transfers is greater than the number (count) of successful transfers. A zero may indicate that the number (count) unsuccessful transfers is the same as the number (count) of successful transfers. The positive value may indicate that number (count) of successful transfers is greater than the number (count) of unsuccessful transfers.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "some embodiments," and/or "some embodiments" mean that a particular feature, structure or characteristic described in connection with some embodiments is included in at least one embodiment of the present disclosure. Therefore, it is emphasized and should be appreciated that two or more references to "some embodiments," "one embodiment," or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 1703, Perl, COBOL 1702, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a software as a service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

We claim:

1. A method implemented on a computing device having at least one storage device storing a set of instructions for recommending a transportation means, and at least one processor in communication with the at least one storage device, the method comprising:
   obtaining, by the at least one processor, current travel information of a target user;
   obtaining, by the at least one processor, historical travel information and social information of the target user;
   determining, by the at least one processor, a user type based on the historical travel information, the user type being a first type or a second type;
   in response to determining that the target user is a user of the first type, determining, by the at least one processor, a clustering model of the target user based on the historical travel information, wherein the clustering model is a first clustering model; or
   in response to determining that the target user is a user of the second type, determining, by the at least one processor, a clustering model of the target user based on the social information, wherein the clustering model is a second clustering model; and
   recommending, by the at least one processor, a transportation means to the target user based on the clustering model and the current travel information of the target user, further comprising:
   determining, by the at least one processor, a current transportation city based on the current travel information;
   obtaining, by the at least one processor, a product flow chart based on the transportation city and the clustering model;
   obtaining, by the at least one processor, a real-time supply and demand of transportation products of the transportation city, and updating the product flow chart;
   determining, by the at least one processor, a plurality of nodes in the updated product flow chart;
   determining, by the at least one processor, a plurality of the shortest paths corresponding to the plurality of nodes using a Shortest Path Faster algorithm;
   determining, by the at least one processor, a strategy set of the target user based on the plurality of the shortest paths; and
   recommending, by the at least one processor, the transportation means to the target user based on the strategy set and the current travel information.

2. The method of claim 1, wherein the historical travel information including a count of historical trips, and the determining a user type based on the historical travel information comprises:
   determining, by the at least one processor, whether the count of historical trips is greater than or equal to a first threshold; and
   in response to determining that the count of historical trips is greater than or equal to the first threshold, determining, by the at least one processor, that the target user is a user of the first type; or in response to determining that the count of historical trips is less than the first threshold, determining, by the at least one processor, that the target user is a user of the second type.

3. The method of claim 1, further comprising:
determining, by the at least one processor, the plurality of nodes of the product flow chart based on the transportation products;
determining, by the at least one processor, values of the plurality of nodes based on acceptance rates of the transportation products; and
determining, by the at least one processor, weights of edges of the product flow chart based on user historical transfer rates.

4. The method of claim 3, further comprising:
obtaining, by the at least one processor, historical travel information of a plurality of users from a transportation platform;
obtaining, by the at least one processor, the transportation products based on the historical travel information;
determining, by the at least one processor, the acceptance rates of the transportation products based on the historical travel information;
determining, by the at least one processor, the user historical transfer rates based on the historical travel information, the user historical transfer rates comprising:
a positive transfer rate, wherein the positive transfer rate is, after a request has been transferred from a first transportation product to a second transportation product, the possibility that an order is generated based on the transferred request is higher than the possibility that the order is not generated; and
a negative transfer rate, wherein the negative transfer rate is, after a request has been transferred from a first transportation product to a second transportation product, the possibility that an order is not generated is higher than the possibility that the order is generated based on the transferred request.

5. The method of claim 1, wherein the recommending the transportation means to the target user based on the strategy set and the current travel information comprises:
determining, by the at least one processor, a current transportation means of the target user based on the current travel information;
determining, by the at least one processor, a first node in the product flow chart based on the current transportation means;
determining, by the at least one processor, a shortest path of the first node based on the first node and the strategy set; and
recommending, by the at least one processor, a transportation means to the target user based on the shortest path of the first node.

6. The method of claim 1, wherein the first clustering model and the second clustering model are determined based on a clustering algorithm.

7. The method of claim 6, further comprises:
obtaining, by the at least one processor, historical travel information and social information of a plurality of users;
determining, by the at least one processor, one or more first clustering models by clustering the historical travel information using an X means algorithm; and
determining, by the at least one processor, one or more second clustering models by clustering the social information using the X means algorithm.

8. The method of claim 7, wherein the determining one or more first clustering models by clustering the historical travel information using an X means algorithm comprises:
determining, by the at least one processor, historical transportation requests and historical order information of the plurality of users during a preset time period based on the historical travel information;
determining, by the at least one processor, a count of requests of each transportation product and a count of trips of each transportation product, for each of the plurality of users, based on the historical transportation requests and the historical order information of the plurality of users during the preset time period;
determining, by the at least one processor, a normalized count of requests of each transportation product during a first time period for each of the plurality of users;
determining, by the at least one processor, a normalized count of trips of each transportation product during the first time period, for each of the plurality of users;
determining, by the at least one processor, a transportation feature vector for each of the plurality of users based on the normalized count of requests during the first time period and the normalized count of trips during the first time period; and
determining, by the at least one processor, the one or more first clustering models by clustering the transportation feature vectors of the plurality of users, using the X means algorithm.

9. The method of claim 7, wherein the determining one or more second clustering models by clustering the social information using the X means algorithm comprises:
determining, by the at least one processor, natural attribute information and social attribute information of the plurality of users based on the social information, wherein the natural attribute information includes a gender and an age, and the social attribute information includes an occupation and an income;
determining, by the at least one processor, a populace feature vector for each of the plurality of users by digitizing the natural attribute information and the social attribute information; and
determining, by the at least one processor, the one or more second clustering models by clustering the populace feature vectors of the plurality of users, using the X means algorithm.

10. A system for recommending transportation means, comprising:
at least one computer-readable storage medium storing a set of instructions; and at least one processor in communication with the at least one computer-readable storage medium, wherein when executing the set of instructions, the at least one processor is directed to cause the system to:
obtain current travel information of a target user;
obtain historical travel information and social information of the target user;
determine a user type based on the historical travel information, the user type being a first type or a second type;
in response to determining that the target user is a user of the first type, determine a clustering model of the target user based on the historical travel information, wherein the clustering model is a first clustering model; or
in response to determining that the target user is a user of the second type, determine a clustering model of the target user based on the social information, wherein the clustering model is a second clustering model; and recommend a transportation means to the target user based on the clustering model and the current travel information of the target user, wherein to recommend a transportation means to the target user based on the clustering model and the current travel information of the target user, the at least one processor is further directed to cause the system to:

determine a current transportation city based on the current travel information;

obtain a product flow chart based on the transportation city and the clustering model;

obtain a real-time supply and demand of transportation products of the transportation city, and update the product flow chart;

determine a plurality of nodes in the updated product flow chart;

determine a plurality of the shortest paths corresponding to the plurality of nodes using a Shortest Path Faster Algorithm;

determine a strategy set of the target user based on the plurality of the shortest paths; and recommend the transportation means to the target user based on the strategy set and the current travel information.

11. The system of claim 10, wherein the historical travel information including a count of historical trips, and to determine a user type based on the historical travel information, the at least one processor is further directed to:

determine whether the count of historical trips is greater than or equal to a first threshold; and in response to determining that the count of historical trips is greater than or equal to the first threshold, determine that the target user is a user of the first type; or in response to determining that the count of historical trips is less than the first threshold, determine that the target user is a user of the second type.

12. The system of claim 10, the at least one processor is further directed to:

determine the plurality of nodes of the product flow chart based on the transportation products;

determine values of the plurality of nodes based on acceptance rates of the transportation products; and determine weights of edges of the product flow chart based on user historical transfer rates.

13. The system of claim 12, the at least one processor is further directed to:

obtain historical travel information of a plurality of users from a transportation platform;

obtain the transportation products based on the historical travel information;

determine the acceptance rates of the transportation products based on the historical travel information;

determine the user historical transfer rates based on the historical travel information, the user historical transfer rates comprising:

a positive transfer rate, wherein the positive transfer rate is, after a request has been transferred from a first transportation product to a second transportation product, the possibility that an order is generated based on the transferred request is higher than the possibility that the order is not generated; and a negative transfer rate, wherein the negative transfer rate is, after a request has been transferred from a first transportation product to a second transportation product, the possibility that an order is not generated is higher than the possibility that the order is generated based on the transferred request.

14. The system of claim 10, wherein to recommend the transportation means to the target user based on the strategy set and the current travel information, the at least one processor is directed to:

determine a current transportation means of the target user based on the current travel information;

determine a first node in the product flow chart based on the current transportation means;

determine a shortest path of the first node based on the first node and the strategy set; and recommend a transportation means to the target user based on the shortest path of the first node.

15. The system of claim 10, wherein the first clustering model and the second clustering model are obtained by a clustering algorithm.

16. The system of claim 15, the at least one processor is further directed to:

obtain historical travel information and social information of a plurality of users;

determine one or more first clustering models by clustering the historical travel information using an X means algorithm; and determine one or more second clustering models by clustering the social information using the X means algorithm.

17. The system of claim 16, wherein to determine one or more first clustering models by clustering the historical travel information using an X means algorithm, the at least one processor is further directed to:

determine historical transportation requests and historical order information of the plurality of users during a preset time period based on the historical travel information;

determine a count of requests of each transportation product and a count of trips of each transportation product, for each of the plurality of users, based on the historical transportation requests and the historical order information of the plurality of users during the preset time period;

determine a normalized count of requests of each transportation product during a first time period for each of the plurality of users;

determine a normalized count of trips of each transportation product during the first time period, for each of the plurality of users;

determine a transportation feature vector for each of the plurality of users based on the normalized count of requests during the first time period and the normalized count of trips during the first time period; and determine the one or more first clustering models by clustering the transportation feature vectors of the plurality of users, using the X means algorithm.

18. The system of claim 16, wherein to determine one or more second clustering models by clustering the social information using the X means algorithm, the at least one processor is further directed to:

determine natural attribute information and social attribute information of the plurality of users based on the social information, wherein the natural attribute information includes a gender and an age, and the social attribute information includes an occupation and an income;

determine a populace feature vector for each of the plurality of users by digitizing the natural attribute information and the social attribute information; and determine the one or more second clustering models by clustering the populace feature vectors of the plurality of users, using the X means algorithm.

19. A non-transitory computer readable medium, comprising executable instructions that, when executed by at least one processor, direct the at least one processor to perform a method, the method comprising:

obtaining, by the at least one processor, current travel information of a target user;

obtaining, by the at least one processor, historical travel information and social information of the target user;

determining, by the at least one processor, a user type based on the historical travel information, the user type being a first type or a second type;

in response to determining that the target user is a user of the first type, determining, by the at least one processor, a clustering model of the target user based on the historical travel information, wherein the clustering model is a first clustering model; or in response to determining that the target user is a user of the second type, determining, by the at least one processor, a clustering model of the target user based on the social information, wherein the clustering model is a second clustering model; and recommending, by the at least one processor, a transportation means to the target user based on the clustering model and the current travel information of the target user, further comprising:

determining, by the at least one processor, a current transportation city based on the current travel information;

obtaining, by the at least one processor, a product flow chart based on the transportation city and the clustering model;

obtaining, by the at least one processor, a real-time supply and demand of transportation products of the transportation city, and updating the product flow chart;

determining, by the at least one processor, a plurality of nodes in the updated product flow chart;

determining, by the at least one processor, a plurality of the shortest paths corresponding to the plurality of nodes using a Shortest Path Faster algorithm;

determining, by the at least one processor, a strategy set of the target user based on the plurality of the shortest paths; and recommending, by the at least one processor, the transportation means to the target user based on the strategy set and the current travel information.

\* \* \* \* \*